(12) United States Patent  
Yamamoto et al.

(10) Patent No.: US 10,276,868 B2
(45) Date of Patent: Apr. 30, 2019

(54) NON-AQUEOUS ELECTROLYTE RECHARGEABLE BATTERY

(71) Applicant: DENSO CORPORATION, Kariya, Aichi-pref. (JP)

(72) Inventors: Nobuo Yamamoto, Kariya (JP); Yoshikazu Kusano, Kariya (JP); Yoshinori Sato, Kariya (JP)

(73) Assignee: DENSO CORPORATION, Kariya (JP)

( * ) Notice: Subject to any disclaimer, the term of this patent is extended or adjusted under 35 U.S.C. 154(b) by 102 days.

(21) Appl. No.: 15/367,659

(22) Filed: Dec. 2, 2016

(65) Prior Publication Data

US 2017/0170476 A1 Jun. 15, 2017

(30) Foreign Application Priority Data

Dec. 11, 2015 (JP) ................................ 2015-242061
Dec. 11, 2015 (JP) ................................ 2015-242069

(51) Int. Cl.
*H01M 10/0525* (2010.01)
*H01M 4/525* (2010.01)
*H01M 4/38* (2006.01)
*H01M 4/485* (2010.01)
*H01M 4/505* (2010.01)
*H01M 4/587* (2010.01)
*H01M 10/42* (2006.01)

(52) U.S. Cl.
CPC ........... *H01M 4/525* (2013.01); *H01M 4/386* (2013.01); *H01M 4/485* (2013.01); *H01M 4/505* (2013.01); *H01M 4/587* (2013.01); *H01M 10/0525* (2013.01); *H01M 2010/4292* (2013.01)

(58) Field of Classification Search
CPC .. H01M 4/525; H01M 10/0525; H01M 4/587; H01M 4/386; H01M 4/505; H01M 4/485; H01M 2010/4292
See application file for complete search history.

(56) References Cited

U.S. PATENT DOCUMENTS 6,270,927 B1 8/2001 Nakane et al.
2006/0216600 A1 9/2006 Inagaki et al.
(Continued)

FOREIGN PATENT DOCUMENTS

JP H08-078006 A 3/1996
JP 2003-142075 A 5/2003
(Continued)

*Primary Examiner* — Stewart A Fraser
(74) *Attorney, Agent, or Firm* — Oliff PLC

(57) ABSTRACT

A non-aqueous rechargeable battery has a non-aqueous electrolyte and positive and negative electrodes capable of intercalating and deintercalating lithium ions. The positive electrode contains a lithium transition metal oxide expressed by $Li_{2-x}Ni_{\alpha}M^1_{\beta}M^2_{\gamma}O_{4-\varepsilon}$, where $0.50<\alpha<=1.33$, $0<=\beta<0.67$, $0<=\gamma<=1.33$, $0<=\varepsilon<=1.00$, $M^1$ is at least one of Co, Al and Ga, and $M^2$ is at least one of Mn, Ge, Sn and Sb, and x reversibly varies within a range of $0<=x<=2$ by intercalating and deintercalating lithium ions. A resistance of the positive electrode when SOC is 0% is not less than twice of that when SOC is not less than a predetermined SOC. A capacity of the negative electrode is not less than 1.1 times of that of the positive electrode.

13 Claims, 9 Drawing Sheets

(56) References Cited

U.S. PATENT DOCUMENTS

| | | | |
|---|---|---|---|
| 2009/0061292 A1 | 3/2009 | Inagaki et al. | |
| 2011/0064973 A1 | 3/2011 | Song | |
| 2015/0072232 A1 | 3/2015 | Nagai | |
| 2015/0325838 A1 | 11/2015 | Tamaki et al. | |
| 2016/0261006 A1 | 9/2016 | Ueno et al. | |
| 2016/0293939 A1* | 10/2016 | Satou | H01M 4/485 |
| 2016/0293948 A1* | 10/2016 | Yamamoto | H01M 4/505 |
| 2016/0293953 A1* | 10/2016 | Shimonishi | H01B 1/08 |
| 2016/0372740 A1* | 12/2016 | Kajiyama | H01M 4/505 |
| 2016/0372798 A1 | 12/2016 | Ishii | |

FOREIGN PATENT DOCUMENTS

| | | |
|---|---|---|
| JP | 2004-047449 A | 2/2004 |
| JP | 2007-095443 A1 | 4/2007 |
| JP | 2013-235653 A | 11/2013 |
| JP | 2015-111491 A | 6/2015 |
| JP | 2017-069160 A | 4/2017 |

* cited by examiner

NON-AQUEOUS ELECTROLYTE RECHARGEABLE BATTERY

CROSS-REFERENCE TO RELATED APPLICATION

This application is related to and claims priority from Japanese Patent Applications No. 2015-242061 filed on Dec. 11, 2015 and No. 2015-242069 filed on Dec. 11, 2015, the contents of which are hereby incorporated by reference.

BACKGROUND OF THE INVENTION

1. Field of the Invention

The present invention relates to non-aqueous electrolyte rechargeable batteries.

2. Description of the Related Art

Electronic devices of small size such as laptop computers or notebook computers as portable personal computers, mobile phones or cell phones as portable telephones, digital cameras, etc. have become widely used. Because such small electronic devices of small size have spread and progressed, rechargeable battery (secondary battery) demand is also increasing around the world. Lithium ion batteries are a commonly used type of rechargeable battery with a global market.

Those small electronic devices of small size require rechargeable batteries, for example, non-aqueous electrolyte rechargeable batteries such as lithium-ion rechargeable batteries which are one of the most popular types of rechargeable batteries for portable electronics because of their high capacity.

There have been studies to apply such a non-aqueous electrolyte rechargeable battery to various types of vehicles and home power sources which need a large amount of electric power. For example, there are electric vehicles (EV, or electric drive vehicles), hybrid vehicles (HV, or hybrid electric vehicles), plug-in hybrid vehicles (PHV, or plug-in hybrid electric vehicles), home energy management system (HEMS), etc. In order to have a large amount of electric power, it is necessary for the non-aqueous electrolyte rechargeable battery to have a plurality of battery cells. Each of those battery cells has electrodes comprised of a plurality of large-sized electrode plates which are stacked to form a laminate.

Because lithium-ion rechargeable batteries as one type of non-aqueous electrolyte rechargeable batteries have superior reversibility to intercalate and de intercalate (charges and discharges) lithium ions, it is possible to use lithium-ion rechargeable batteries repeatedly. For example, patent document 1, Japanese patent laid open publication No. 2007-95443, has disclosed such a lithium-ion rechargeable battery.

Patent document 1 has disclosed a non-aqueous electrolyte rechargeable battery composed of a positive electrode, a negative electrode and non-aqueous electrolyte. This non-aqueous electrolyte rechargeable battery is configured to have a structure in which:

the positive electrode and the negative electrode are made of material capable of intercalating and deintercalating lithium ions;

a charge capacity ratio (capacity of the negative electrode 12/the capacity of the positive electrode 11) is within a range of 1.0 to 1.15 until a positive electrode potential reaches 4.5 volts (vs. Li/Li$^+$); and a principal component of an active electrode material forming the positive electrode active material is a lithium transition metal composite oxide expressed by a formula of $Li_aMn_sNi_tCo_uMo_vO_2$, where $0<=a<=1.2$, $s+t+u=1$, $0<s<=0.5$, $0<t<=0.5$, $0.45<=s/(s+t)<=0.55$, $0.45<=t/(s+t)<=0.55$, $u>=0$, $0.001<=v<=0.01$.

The positive electrode active material (as positive electrode material) in a conventional non-aqueous electrolyte rechargeable battery does not have adequate safety. Specially, a crystal structure of the lithium transition metal composite oxide used in the positive electrode active material is destroyed due to a long time of use, and oxygen contained in the lithium transition metal composite oxide releases.

In order to solve this problem, there have been proposed non-aqueous electrolyte secondary batteries containing composite oxide material as a positive electrode active material expressed by a formula of $Li_{2-x}Ni_\alpha M^1_\beta M^2_\gamma O_{4-\varepsilon}$, where $0.50<\alpha<=1.33$, $0<=\beta3<0.67$, $0<=\gamma<=1.33$, $0<=\varepsilon<=1.00$, $M^1$ is at least one of Co, Al and Ga, $M^2$ is at least one of elements expressed by Mn, Ge, Sn and Sb, and the variable x in the formula varies within a range of $0<=x<=2$ by intercalating and deintercalating lithium ions.

However, the positive electrode made of a positive electrode active material expressed by $Li_{2-x}Ni_\alpha M^1_\beta M^2_\gamma O_{4-\varepsilon}$, increases its resistance in a low SOC region. The increasing of the positive electrode resistance deteriorates performance of the non-aqueous electrolyte secondary battery when the charge and discharge of the non-aqueous electrolyte secondary battery using the positive electrode made of a positive electrode active material expressed by $Li_{2-x}Ni_\alpha M^1_\beta M^2_\gamma O_{4-\varepsilon}$, is performed in the low SOC region. This means that the deterioration of battery performance of the non-aqueous electrolyte rechargeable battery as the lithium-ion rechargeable battery is generated in the low SOC region. The deterioration of battery performance of the non-aqueous electrolyte secondary battery occurs in the low SOC region.

SUMMARY

It is therefore desired to provide non-aqueous electrolyte secondary battery capable of suppressing battery performance thereof from deteriorating in a low SOC region.

An exemplary embodiment according to the present invention provides a non-aqueous rechargeable battery having a positive electrode, a negative electrode and a non-aqueous electrolyte. The positive electrode and the negative electrode are capable of intercalating and deintercalating lithium ions. In the non-aqueous rechargeable battery, the positive electrode contains a lithium transition metal oxide expressed by a formula of $Li_{2-x}Ni_\alpha M^1_\beta M^2_\gamma O_{4-\varepsilon}$, where $0.5<\alpha<=1.33$, $0<=\beta3<0.67$, $0<=\gamma<=1.33$, $0<=\varepsilon<=1.00$, $M^1$ is at least one of Co, Al and Ga, and $M^2$ is at least one of Mn, Ge, Sn and Sb, and x reversibly varies within a range of $0<=x<=2$ by intercalating and deintercalating lithium ions. A resistance of the positive electrode when a state of charge (SOC) is zero % is not less than twice of a resistance of the positive electrode when the SOC is not less than a predetermined SOC. A capacity of the negative electrode is not less than 1.1 times of a capacity of the positive electrode.

The non-aqueous rechargeable battery according to the present invention has the improved features, one of which is to avoid use of the non-aqueous rechargeable battery in a low SOC region even if the positive electrode contain an oxide which increases a resistance of the positive electrode in the low SOC region by adjusting a capacity of the negative electrode. This feature makes it possible to suppress the performance of the non-aqueous rechargeable battery in the low SOC region from deteriorating.

It is preferable for the non-aqueous rechargeable battery according to the present invention to have a structure in which an irreversible capacity loss of the positive electrode at its initial charge and discharge is less than an irreversible capacity loss of the negative electrode at its initial charge and discharge. This structure makes it possible to provide the improved effects previously described even if the capacity of the positive electrode and the negative electrode varies from the capacity of the positive electrode and the negative electrode at the initial charge and discharge.

It is preferable for the non-aqueous rechargeable battery according to the present invention to have a structure in which the SOC of the positive electrode is not less than the predetermined SOC when the non-aqueous rechargeable battery reaches the lower limit voltage. This improved structure makes it possible to use the non-aqueous rechargeable battery without using it in the low SOC region of the positive electrode, and to provide the effects previously described.

In accordance with another aspect of the present invention, there is provided a non-aqueous rechargeable battery having a positive electrode, a negative electrode and a non-aqueous electrolyte. The positive electrode and the negative electrode are capable of intercalating and deintercalating lithium ions. In the non-aqueous rechargeable battery, the positive electrode contains a lithium transition metal oxide expressed by a formula of $Li_{2-x}Ni_\alpha M^1_\beta M^2_\gamma O_{4-\varepsilon}$, where $0.50<\alpha<=1.33$, $0<=\beta<0.67$, $0<=\gamma<=1.33$, $0<=\varepsilon<=1.00$, $M^1$ is at least one of Co, Al and Ga, and $M^2$ is at least one of Mn, Ge, Sn and Sb, and x reversibly varies within a range of $0<=x<=2$ by intercalating and deintercalating lithium ions. A resistance of the positive electrode when a state of charge (SOC) is zero % is not less than twice of a resistance of the positive electrode when the SOC is not less than a predetermined SOC.

A ratio of a first capacity of the negative electrode and a second capacity of the negative electrode is not less than 0.05, where the first capacity is within a range of more than (an average OCP−0.10 [V]) and less than (the average OCP+0.25 [V]), the second capacity is greater than the (average OCP+0.25 [V]), and the average OCP is a potential of the negative electrode when the non-aqueous rechargeable battery has the SOC of 50%. By the way, the OCP means an open circuit potential which will be explained later.

Even if the positive electrode is made of using oxide material which increasing its resistance in a low SOC region, the improve structure of the non-aqueous rechargeable battery according to the present invention adjusts the capacity of the negative electrode so as to avoid the non-aqueous rechargeable battery from performing in the low SOC region. As a result, it is possible to suppress the battery performance of the non-aqueous rechargeable battery from deteriorating in the low SOC region.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
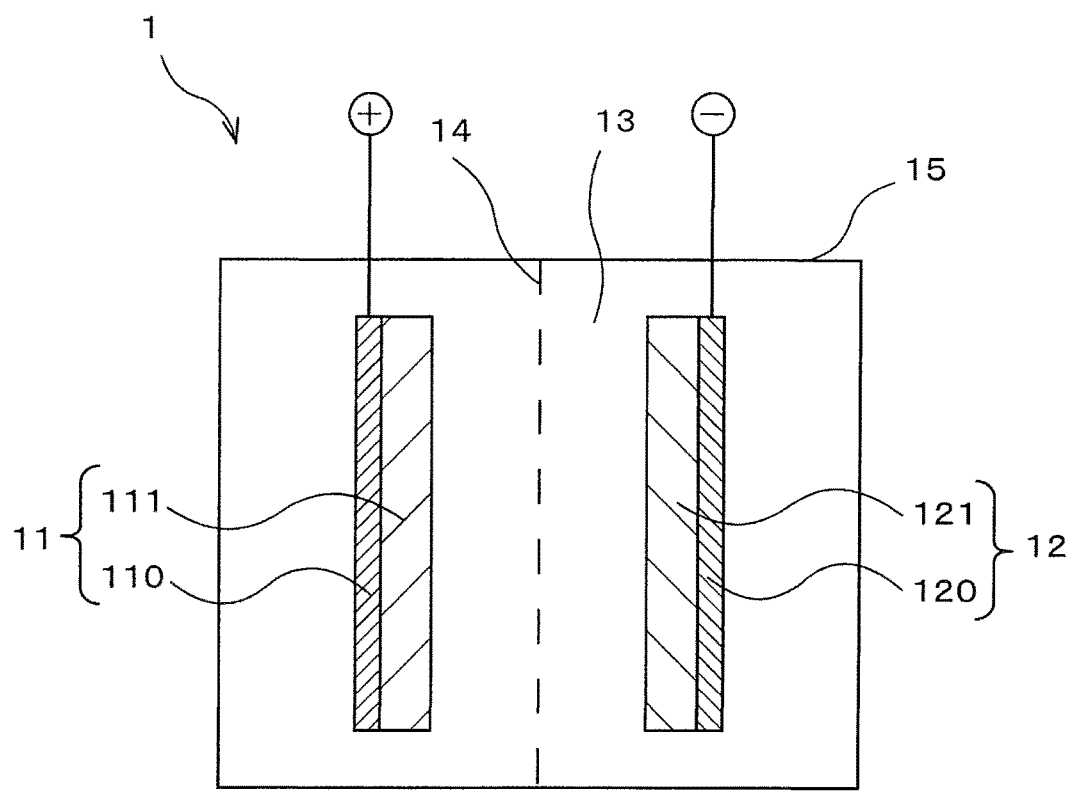
FIG. 1 is a view showing a schematic structure of a non-aqueous electrolyte rechargeable battery according to first and fourth exemplary embodiments of the present invention.

Hereinafter, various embodiments of the present invention will be described with reference to the accompanying drawings. In the following description of the various embodiments, like reference characters or numerals designate like or equivalent component parts throughout the several diagrams.

First Exemplary Embodiment

A description will be given of a lithium-ion rechargeable battery according to the first exemplary embodiment with reference to FIG. 1 to FIG. 4.

FIG. 1 is a view showing a schematic structure of the lithium-ion rechargeable battery 1, as a non-aqueous electrolyte rechargeable battery, according to the first exemplary embodiment and the fourth exemplary embodiment. The fourth exemplary embodiment will be explained later.

That is, the lithium-ion rechargeable battery according to the first exemplary embodiment has been obtained as an application of the concept of the non-aqueous rechargeable battery according to the present invention. In general, a rechargeable battery is also referred as a secondary battery.

[Lithium-Ion Rechargeable Battery]

As shown in FIG. 1, the lithium-ion rechargeable battery 1 is basically composed of a positive electrode 11, a negative electrode 12, a non-aqueous electrolyte 13, a separator 14 and a battery casing 15.

In more detail, FIG. 1 shows the schematic structure of the lithium-ion rechargeable battery 1 in which the positive electrode 11 consists of a positive electrode current collector 110 and a positive electrode active material layer 111, the negative electrode 12 consists of a negative electrode current collector 120 and a negative electrode active material layer 121, and the battery casing 15 accommodates the positive electrode 11, the negative electrode 12, the non-aqueous electrolyte 13 and the separator 14. The positive electrode 11 faces the negative electrode 12 in the non-aqueous electrolyte 13, and the positive electrode 11 and the negative electrode 12 are insulated from each other by the separator 14.

[Positive Electrode]

As shown in FIG. 1, the positive electrode active material layer 111 is formed on a surface of the positive electrode current collector 110. The positive electrode active material layer 111 contains a positive electrode active material.

The positive electrode material is a mixture of a positive electrode active material, a conductive material and a binder. The positive electrode material as the mixture is applied on a surface of the positive electrode current collector 110. The positive electrode current collector 110 on which the mixture has been applied is then dried to form the positive electrode active material layer 111. That is, it is acceptable to remove the conductive material and the binder from the mixture. The positive electrode material is formed as a paste (or a slurry) by using an appropriate solvent. It is also acceptable to add a known additive into the positive electrode material to form the positive electrode 11.

[Positive Electrode Active Material]

The lithium-ion rechargeable battery 1 as the non-aqueous electrolyte rechargeable battery according to the first exemplary embodiment uses a lithium transition metal oxide as the positive electrode active material expressed by a formula of $Li_{2-x}Ni_\alpha M^1_\beta M^2_\gamma O_{4-\epsilon}$, where $0.50 < \alpha <= 1.33$, $0 <= \beta < 0.67$, $0 <= \gamma <= 1.33$, $0 <= \epsilon <= 1.00$, $M^1$ is at least one of Co, Al and Ga, and $M^2$ is at least one of Mn, Ge, Sn and Sb, and x reversibly varies within a range of $0 <= x <= 2$ by intercalating and deintercalating lithium ions.

The lithium transition metal oxide contains Ni, where Ni forms a local structure in which six O atoms are coordinated (6-coordinated local structure). This structure makes it possible to provide stable charge and discharge. Further, because a large amount of Ni as an oxidation and reduction species is contained within a range of $0.50 < \alpha <= 1.33$, this provides high capacity of the lithium-ion rechargeable battery 1 as the non-aqueous electrolyte rechargeable battery according to the first exemplary embodiment.

Still further, because a large amount of the $M^1$ and $M^2$ are contained, this makes it possible to provide a stable crystal structure during charge and discharge. As a result, this makes it possible to prevent the lithium-ion rechargeable battery 1 as the non-aqueous electrolyte rechargeable battery according to the first exemplary embodiment from causing deterioration of battery capacity.

Because the $M^1$ is a trivalent element, the addition of the $M^1$ makes it possible to prevent Li from entering a Ni layer, where the $M^1$ being greatly different in valence number from Li.

The presence of the $M^2$ strongly fixes oxygen, and as a result, it is possible to suppress oxygen deficiency when abnormal heat generation occurs, and this structure makes it possible to increase safety of the lithium-ion rechargeable battery 1 as the non-aqueous electrolyte rechargeable battery according to the first exemplary embodiment.

Still further, when the amount of the $M^2$ becomes not less than 0.33, all of oxygen atoms in the Ni layer are arranged adjacent to the $M^2$, and oxygen atoms and the $M^2$ are combined with each other. This structure makes it possible to provide superior oxygen deficiency suppression effect.

It is preferable for both the $M^1$ and the $M^2$ to have a 6-coordination. This structure makes it possible to decrease a structural gap between the $M^1$ and $M^2$ which is close to transition metal elements (Coordination structure of Ni and Mn), and to improve durability of the lithium-ion rechargeable battery 1 as the non-aqueous electrolyte rechargeable battery according to the first exemplary embodiment.

It is preferable to contain Mn as transition metal (within a ratio of not less than 0 and not more than 1.00) in a composition of the lithium transition metal oxide. Similar to Ni, Mn forms a local structure in which 6 oxygen (O) atoms are coordinated (6-coordinated local structure). This structure makes it possible to stabilize Ni layer.

In general, overcharge of a lithium-ion rechargeable battery can cause sudden smoke and/or fire. This phenomenon is due to oxygen emitted from the positive electrode active material (positive electrode material) in the lithium-ion rechargeable battery. Specifically, electrons are supplied from oxygens contained in the positive electrode active material due to charge, and oxygen is released.

Because the $M^2$ has been added into the lithium-ion transition metal oxide, the added $M^2$ and oxygen are strongly combined with each other, rather than Ni and Mn (transition metal). That is, the addition of the $M^2$ can suppress oxygen deficiency during charge and discharge.

The lithium-ion transition metal oxide has a layer structure with a Li layer and a Ni layer. This structure provides the positive electrode having a superior Li ion conductivity. This Li layer indicates a layer made of Li as a principal component. That is, the Li layer is substantially made of Li. The Ni layer indicates a layer made of Ni (Ni compound) as a principal component. That is, the Ni layer is substantially made of the $M^1$ and the $M^2$ as principal components.

In the lithium-ion rechargeable battery 1 as the non-aqueous electrolyte rechargeable battery according to the first exemplary embodiment, it is preferable for the lithium-ion transition metal oxide to have a structure expressed by the formula of $Li_2Ni_\alpha M^1_\beta M^2_\gamma Mn_\eta O_{4-\epsilon}$, where $0.50 < \alpha <= 1.33$, $0.33 <= \gamma <= 1.1$, $0 <= \eta <= 1.00$, $0 <= \beta <= 0.67$, $0 <= \epsilon <= 1.00$, $M^1$ is at least one of Co and Ga, and $M^2$ is at least one of Ge, Sn and Sb.

It is also preferable for the positive electrode active material to be the lithium-ion transition metal oxide. However, it is sufficient for the positive electrode active material to be a mixture which contains a known positive electrode active material(s) other than the oxide previously described.

The positive electrode active material to be mixed is a compound capable of intercalating and deintercalating lithium ions (electrolyte ion of a non-aqueous electrolyte rechargeable battery, alkali metal ion). For example, it is possible to use various types of oxide, sulfide, lithium oxide, conductive polymer, etc. It is preferable to use a lithium-transition metal composite oxide as the positive electrode active material.

It is more preferable to use composite oxide having a layer structure, composite oxide having a spinel structure, and/or composite oxide having a polyanion structure as the lithium-transition metal composite oxide as the positive electrode active material.

When the positive electrode active material is a mixture, the concept of the present invention does not limit a mixing ratio of the mixture. However, it is preferable for the positive electrode active material to be a main component of the lithium-ion transition metal oxide, (for example, the number of Li atoms is not less than 50%) when the total number of Li atoms in the positive electrode active material is 100%.

Further, it is also preferable for the mass of lithium-ion transition metal oxide to be a mass of not less than 50 mass % when the total mass of the positive electrode active material is 100 mass %.

The concept of the present invention is not limited by a manufacturing process of producing the positive electrode active material used in the lithium-ion rechargeable battery 1 as the non-aqueous electrolyte rechargeable battery according to the first exemplary embodiment. It is possible to produce the positive electrode active material by a known manufacturing method. It is acceptable for the positive electrode active material to have secondary particles consisting of aggregations of primary particles. The primary particle is not limited in its shape. For example, it is acceptable for the primary particles to have a scale shape, a ball shape, a potato-like shape, etc.

It is more preferable for the primary particle forming the positive electrode active material to have a crystallite diameter of not more than 100 nm, and to have a minor axis of not more than 1 μm.

It is more preferable for the primary particle forming the positive electrode active material to have a minor axis of not more than 500 nm.

It is preferable for the primary particle forming the positive electrode active material to have approximately a ball shape having a particle size (for example, an average particle size D50) of not more than 1 μm, and more preferable to have such a ball shape having a particle size of not more than 0.5 μm (500 nm).

[Conductive Material, Binder, Mixture, Positive Electrode Current Collector]

The conductive material has electric conductivity of the positive electrode 11. It is possible to use carbon black (CB), amorphous carbon fine particles such as needle coke, etc. There are acetylene black (AB), ketien black (KB), carbon nano-fiber (CN), etc. as the carbon black (CB) fine graphite particles.

The binder of the positive electrode mixture bonds the positive electrode active material particles with conductive material. There are known as binder, polyVinylidene diFluoride (PVDF), ethylene propylene diene Monomer (EPDM), styrene-butadiene rubber (SBR), acrylonitrile butadiene rubber (NBR), fluorine-containing rubber, etc. However, the concept of the present invention is not limited by this, and it is acceptable to use another type of binder.

Organic solvent is used as the positive electrode mixture in order to dissolve the binder. For example, there are, as organic solvent, N-methyl-2-pyrrolidone (NMP), dimethyl formamide, dimethyl acetamide, methyl ethyl ketone, cyclohexznone, methyl acetate, methyl acrylate, diethylene triamine, N—N-dimethyl amino propylamine, ethylene oxide, tetrahydrofuran, etc.

The concept of the present invention is not limited by the solvent previously described. It is also acceptable to use a mixture slurry of a positive electrode active material with polytetrafluoroethylene (PTFE) by adding water, dispersing agent, thickener, etc.

It is possible to use an available current collector as the positive electrode current collector 110. For example, it is acceptable to use a foil plate, a net plate, a punched metal plate, and a formed metal plate made of aluminum which has been processed. However, the concept of the present invention is not limited by these materials and products.

The thickness of the positive electrode current collector 110 is not especially limited. It is possible for the positive electrode current collector 110 to have the same thickness as a conventional positive electrode current collector. For example, it is preferable for the positive electrode current collector 110 to have a thickness of not more than 20 μm. It is more preferable for the positive electrode current collector 110 to have a foil plate having a thickness of approximately 15 μm.

[Properties of Positive Electrode]

When the SOC (state of charge) of the positive electrode 11 is zero %, the positive electrode 11 has a resistance which is not less than twice of a SOC which is not less than a predetermined SOC. The resistance of the positive electrode 11 is a resistance of a single pole (hereinafter, a single pole resistance). It is possible to calculate the single pole resistance of the positive electrode 11 on a basis of a current (charge and discharge rate) and a voltage when an experimental battery cell (of a half-cell type) in which an opposite electrode is made of Li metal, which will be explained later. The resistance of the positive electrode 11 indicates the resistance when the SOC is approximately zero %, which is within a range of several % around zero %. In particular, the range of the SOC includes a region capable of correctly measuring a current and voltage of the experimental battery cell during charge and discharge. In general, it is difficult to measure a discharge resistance of the test cell at the SOC of zero %. In this case, it is possible to measure a discharge resistance by performing the discharge of the test cell from several % SOC to zero % SOC, and use the measured resistance as the discharge resistance of the test cell at the SOC of zero %.

In the lithium-ion rechargeable battery 1 as the non-aqueous electrolyte rechargeable battery according to the first exemplary embodiment, the positive electrode 11 has a resistance when the SOC is zero % which is not less than twice of the resistance when the SOC is not less than the predetermined SOC. The positive electrode having such resistance performance has a high resistance value when the SOC is low around zero %. In other words, the resistance value of the positive electrode 11 when the SOC is zero % is higher than that when the SOC of the positive electrode 11 is not less than the predetermined SOC.

The present invention does not limit a value of predetermined SOC. It is preferable for the predetermined SOC to have a value as low as possible.

The SOC region of the positive electrode 11 having a high resistance increases and the charge and discharge region in the lithium-ion rechargeable battery 1 is decreased due to the increasing of the value of the predetermined SOC. It is accordingly preferable for the predetermined SOC to have a value of not more than 15%.

It is acceptable to measure resistance performance (a relationship between resistance and SOC) of the positive electrode 11 in advance, and calculate a SOC value when a resistance value thereof becomes half of the resistance value (or a predetermined resistance value which is not more than a half resistance value) when the SOC is zero %. After this, it is possible to use the obtained SOC value.

[Negative Electrode]

In the lithium-ion rechargeable battery 1 as the non-aqueous electrolyte rechargeable battery according to the first exemplary embodiment, the negative electrode 12 contains negative electrode material. A negative electrode active material layer 121 is formed on a surface of the negative electrode current collector 120 in the negative electrode 12.

The negative electrode active material layer 121 is formed by mixing negative electrode active material and binder together to produce negative electrode material, and applying the produced negative electrode material on a surface of the negative electrode current collector 120, and then drying it. The negative electrode material is formed as a paste (or a slurry) by using an appropriate solvent. It is acceptable to add a known additive into the negative electrode material and the negative electrode 12.

[Negative Electrode Active Material]

It is possible to use a conventional negative electrode active material to produce the negative electrode 12 in the lithium-ion rechargeable battery 1 as the non-aqueous electrolyte rechargeable battery according to the first exemplary embodiment. For example, it is possible to use a conventional negative electrode active material containing at least one of C, Si, Ti, Sn, Sb and Ge.

It is preferable for the negative electrode active material containing C to be a carbon material capable of intercalating and deintercalating electrolyte ions of the lithium-ion rechargeable battery 1, i.e. to have Li ion intercalation capability. It is more preferable for the negative electrode active material to contain graphite.

The negative electrode active material which contains at least one selected form Sn, Sb and Ge is allowed to be a material capable of varying its volume due to charge and discharge. It is acceptable for the negative electrode active material to be an alloy of another metal and one of Sn, Sb and Ge, for example, an alloy of Ti—Si, Ag—Sn, Sn—Sb, Ag—Ge, Cy-Sn, Ni—Sn, etc.

There are titanium-containing metal oxides, suitable for the negative electrode active material containing Ti, such as lithium titanium oxide, titanium oxide, niobium titanium composite oxide, etc.

[Conductive Material, Binder, Mixture, Negative Electrode Current Collector]

It is possible to use carbon material, metal powder, and conductive polymer as the conductive material of the negative electrode 12. In view of conductivity and stability, it is preferable to use carbon material such as AB, KB, CB, etc.

It is possible to use, as the binder of the negative electrode 12, PTFE, PVDF, fluorine resin copolymer (4 fluorinated ethylene-hexafluoride propylene copolymer), SBR, acrylic rubber, fluorine-based rubber, polyvinyl alcohol (PVA), styrene-maleic acid resin, polyacrylate, carboxyl methyl cellulose (CMC), etc.

It is also possible to use, as a solvent of negative electrode material of the negative electrode 12, organic solvent such as MNP, water or aqueous solvent.

It is possible to use a conventional current collector as the negative electrode current collector 120, for example, to use material obtained by processing metal such as Cu, stainless, titanium and nickel. For example, it is possible to use, as the negative electrode current collector 120, a foil plate, a net plate, a punched metal plate, a formed metal plate. However, the concept of the present invention is not limited by these materials and products.

[Non-Aqueous Electrolyte Body]

It is also acceptable to use conventional aqueous electrolyte as the non-aqueous electrolyte 13. That is, it is possible to use, as the non-aqueous electrolyte 13, material in which a supporting electrolyte is dissolved in non-aqueous solvent. In addition, it is acceptable to use the non-aqueous electrolyte 13 with a conventional additive.

The supporting electrolyte is not limited by the material containing lithium. For example, it is preferable to use, as the supporting electrolyte, at least one of inorganic salts of $LiPF_6$, $LiBF_4$, $LiClO_4$, and $LiAsF_6$, a derivative of these inorganic salts, and organic salt selected from $LiSO_3CF_3$, $LiC(SO_3CF_3)_3$, $LiN(SO_2CF_3)$, $LiN(SO_2C_2F_5)_2$, $LiN(SO_2CF_3)(SO_2C_4F_9)$, and a derivative of these organic salts. The presence of these supporting electrolytes provides a superior battery performance. Further, this makes it possible to enhance its battery performance at a temperature which is different to the room temperature. The present invention does not limit a concentration of the supporting electrolyte. It is preferable to select an optimum concentration of the supporting electrolyte on the basis of the type of the supporting electrolyte and the kind of organic solvent.

The non-aqueous solvent dissolves the supporting electrolyte. It is acceptable for the non-aqueous solvent to have another capability other than the capability of dissolving the non-aqueous solvent. For example, it is preferable to use, as the non-aqueous solvent, carbonates, halogenated hydrocarbons, ethers, ketones, nitriles, lactones, oxolane compounds, etc. In particular, it is preferable to use propylene carbonate, ethylene carbonate (EC), 1,2-Dimethoxyethane, dimethyl carbonate (DMC), diethyl carbonate (DEC), ethyl methyl carbonate (EMC), vinylene carbonate (VC), etc., and a mixed solvent thereof. It is preferable to use a non-aqueous solvent of not less than one of carbonates and ethers in those organic solvents in order to provide superior solubility, dielectric constant, viscosity of the supporting electrolyte, and to increase charge and discharge efficiency of the lithium ion rechargeable battery 1.

There is a conventional additive which is decomposed to form a film (for example, solid electrolyte interphase, SEI) on a surface of an electrode (i.e. on a surface of the positive electrode, in particular, the positive electrode active material). This film formed on the surface of the electrode (positive electrode) has stable performance. When the positive electrode becomes at a high potential (i.e. the charge operation progresses at a high potential of the positive electrode), the film formed on the surface of the electrode (positive electrode) is not decomposed and continues to have stable performance. This structure makes it possible to suppress capacity of the electrode (positive electrode) from by the formation of this film from deteriorating.

[Separator]

The separator 14 insulates the positive electrode 11 from the negative electrode 12, and supports the non-aqueous electrolyte 13. For example, it is preferable to use a porous synthetic resin film as the separator 14, in particular, to use polyolefin-based polymer (polyethylene, polypropylene).

[Battery Casing]

The battery casing 15 accommodates the positive electrode 11, the negative electrode 12, the separator 14 and the non-aqueous electrolyte 13. That is, the positive electrode 11, the negative electrode 12, the separator 14 and the non-aqueous electrolyte 13 are stored in an inside of the battery casing 15, and completely sealed.

The battery casing 15 is made of a material capable of preventing water from penetrating into the inside of the battery casing 15 from the outside. For example, it is possible to use metal and a laminated film having a metal layer as the battery casing 15.

[Structure of Rechargeable Battery]

As shown in FIG. 1, the lithium-ion rechargeable battery 1 according to the first exemplary embodiment has the positive electrode 11 and the negative electrode 12. The negative electrode 12 has a capacity which is 1.1 times of the capacity of the positive electrode 11. That is, the capacity ratio (capacity of the negative electrode 12/the capacity of the positive electrode 11) is not less than 1.1.

When the capacity ratio becomes not less than 1.1 as previously described, the lithium-ion rechargeable battery 1 does not use the SOC region (low SOC region) in which the positive electrode 11 has a high resistance. This structure of the lithium-ion rechargeable battery 1 according to the first exemplary embodiment makes it possible to suppress the battery performance in the low SOC region from deteriorating.

If the capacity ratio becomes less than 1.1, the following two SOC regions are overlapped together:

the SOC region in which the charge and discharge of the lithium-ion rechargeable battery 1 is performed (i.e. the SOC region between the upper limit voltage and the lower limit voltage of the lithium-ion rechargeable battery 1); and the SOC region in which the positive electrode 11 has a high resistance.

That is, when the lithium-ion rechargeable battery 1 is charged (or discharged) in the low SOC region, the positive electrode 11 is also charged in the low SOC region. As a result, the battery performance of the lithium-ion rechargeable battery 1 is deteriorated due to the high resistance of the positive electrode 11.

The present invention does not limit an upper limit value of the capacity ratio. However, when the capacity ratio has a high value, a usable SOC region for the charge and discharge of the lithium-ion rechargeable battery 1 decreases. That is, the battery capacity of the positive electrode 11 decreases. It is therefore preferable for the capacity ratio to be not more than 2.0, more preferable, to be not more than 1.8.

It is possible to adjust the capacity ratio on the basis of: a weight of material (or application mass) to be applied on the surface of the positive electrode 11 to form the positive electrode active layer 111 on the positive electrode 11;

a weight of material (or application mass) to be applied on the surface of the negative electrode 12 to form the negative electrode active layer 121 on the negative electrode 12; and a content (or content density) of each of the positive electrode active material and the negative electrode active material.

In the lithium-ion rechargeable battery 1 as the non-aqueous electrolyte rechargeable battery according to the first exemplary embodiment, it is preferable that the irreversible capacity loss of the positive electrode 11 as its initial charge and discharge is less than the irreversible capacity loss of the negative electrode 12 at its initial charge and discharge. This structure makes it possible for the lithium-ion rechargeable battery 1 not to use the SOC region (low SOC region) in which the positive electrode 11 has a high resistance even if the performance of the positive electrode 11 and the negative electrode 12 vary (capacity decreasing) due to the irreversible capacity loss at the initial charge and discharge. As a result, it is possible to suppress the battery performance of the lithium-ion rechargeable battery 1 according to the first exemplary embodiment from deteriorating in the low SOC region.

It is preferable for the lithium-ion rechargeable battery 1 according to the first exemplary embodiment to have the lower limit voltage (X [V]) within a range of $2.5 \leq X \leq 3.0$, and to have an open circuit potential (OCP) of the negative electrode 12 of not less than (2.7−X) [V] when the lithium-ion rechargeable battery 1 reaches the lower limit voltage. This structure allows the lithium-ion rechargeable battery 1 according to the first exemplary embodiment not to use the SOC region (low SOC region) in which the positive electrode 11 has a high resistance. As a result, it is possible to suppress the battery performance of the lithium-ion rechargeable battery 1 from deteriorating in the low SOC region.

It is also possible to measure the open circuit potential (OCP) of each of the positive electrode 11 and the negative electrode 12 by using an experimental cell of a half-cell type by the same measurement method previously described.

[Effects]

(1) First Effect

As previously described, the lithium-ion rechargeable battery 1 according to the first exemplary embodiment uses a lithium transition metal oxide as the positive electrode active material. In particular, the resistance value of the positive electrode 11 when the SOC is zero % is not less than twice of the resistance thereof when the SOC is not less than the predetermined SOC. Further, the capacity of the negative electrode 12 is not less than 1.1 times of the capacity of the positive electrode 11 in the lithium-ion rechargeable battery 1 according to the first exemplary embodiment. This structure makes it possible to provide the improved effect to suppress the electrical performance of the lithium-ion rechargeable battery 1 from deteriorating in a low SOC region.

Figure 2:
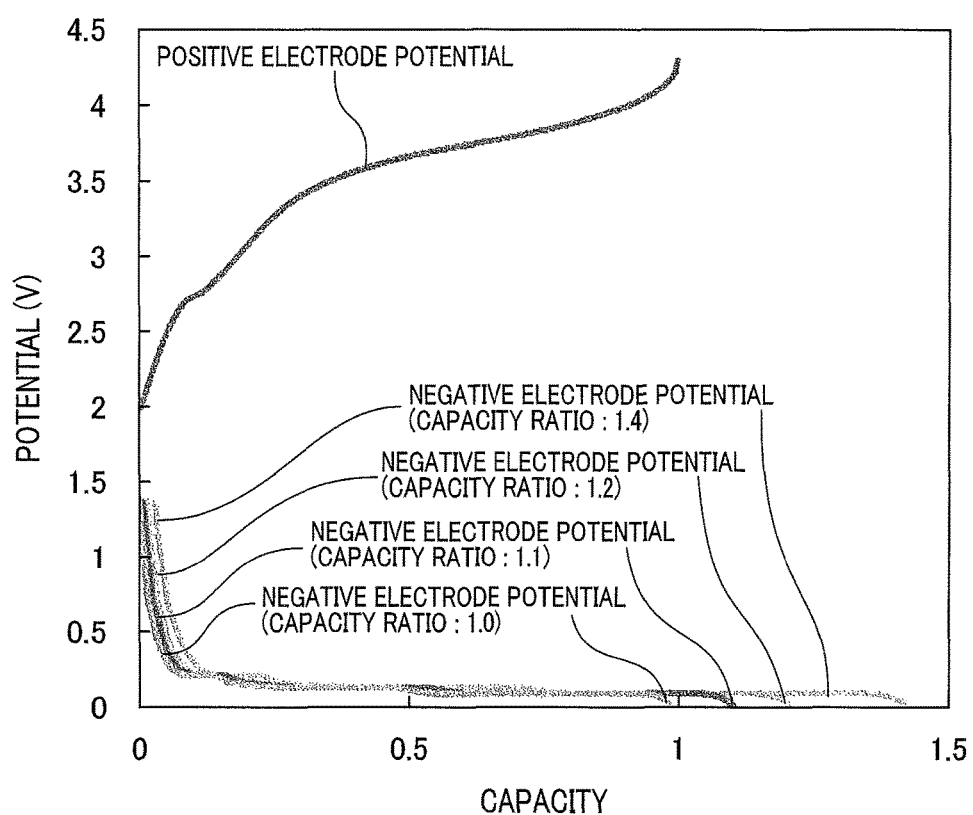
FIG. 2 is a graph showing a relationship in capacity and potential between a positive electrode and a negative electrode of the non-aqueous electrolyte rechargeable battery according to the first exemplary embodiment shown in FIG. 1.
Figure 3:
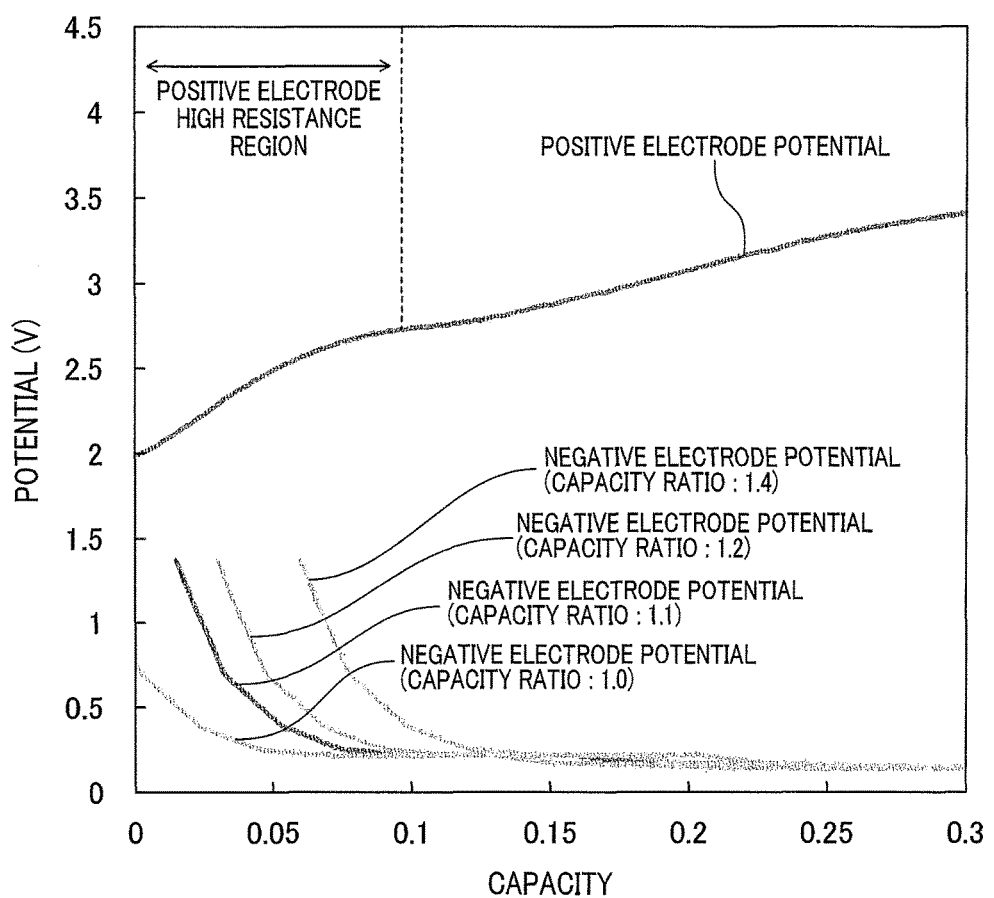
FIG. 3 is a graph showing another relationship in capacity and potential between the positive electrode and the negative electrode of the non-aqueous electrolyte rechargeable battery according to the first exemplary embodiment shown in FIG. 1.

FIG. 2 and FIG. 3 show the relationship in capacity and potential between the positive electrode 11 and the negative electrode 12. In more detail, FIG. 2 is a graph showing the relationship in capacity and potential between the positive electrode 11 and the negative electrode 12 of the lithium-ion rechargeable battery 1 as the non-aqueous electrolyte rechargeable battery according to the first exemplary embodiment shown in FIG. 1. FIG. 3 is a graph showing another relationship in capacity and potential between the positive electrode 11 and the negative electrode 12 of the lithium-ion rechargeable battery 1 as the non-aqueous electrolyte rechargeable battery according to the first exemplary embodiment shown in FIG. 1.

In particular, each of the graphs shown in FIG. 2 and FIG. 3 is obtained on the basis of the SOC of the positive electrode 11. FIG. 3 shows the enlarged graph around the SOC of zero % shown in FIG. 2. FIG. 2 and FIG. 3 show the graphs in which the capacity in the x axis has a value of 1.0 when the SOC is 100%.

As shown in FIG. 2 and FIG. 3, the potential of the positive electrode 11 increases until 15%, i.e. within a range from zero % to 15% SOC, and does not vary or gradually and slightly increases when the SOC exceeds 15%.

The lithium-ion rechargeable battery 1 according to the first exemplary embodiment uses a lithium transition metal oxide as the positive electrode active material. This lithium transition metal oxide has a high resistance in a low SOC region (which is designated by reference character "positive electrode high resistance region" shown in FIG. 3). In more detail, the resistance value of the lithium transition metal oxide when the SOC is zero % is not less than twice of the resistance thereof when the SOC is not less than the predetermined SOC. FIG. 3 shows that the predetermined SOC indicates 15%.

A potential curve of the negative electrode 12 suddenly decreases when the SOC increases from zero %. When the potential of the negative electrode 12 is sufficiently low, the potential of the negative electrode 12 does not change or slowly decreases. The voltage of the lithium-ion rechargeable battery 1 corresponds to a difference in potential (potential difference) between the two potential curves when those potential curves of both the positive electrode 11 and the negative electrode 12 are simultaneously shown in the same graph. (See FIG. 3).

The capacity of the negative electrode 12 is within a range of 1.1 to 1.8 times of the capacity of the positive electrode 11 in the lithium-ion rechargeable battery 1 according to the first exemplary embodiment.

FIG. 3 shows the potential curve of the negative electrode 12 when the capacity ratio is 1.0, 1.1 and 1.2, respectively. As shown in FIG. 3, the more the capacity increases, the more the potential curve is shifted toward the high capacity side.

The shift of the potential curve toward the high capacity side is on the basis of the initial irreversible capacity loss of the negative electrode 12. The irreversible capacity loss corresponds to the capacity of the negative electrode 12. That is, the irreversible capacity loss of the negative electrode 12 increases according to the increasing of the capacity of the negative electrode 12.

That is, the SOC region of the negative electrode 12 in which the negative electrode 12 charges and discharges (hereinafter, referred to as the "chargeable and rechargeable SOC region") is shifted toward the high capacity side according to the increasing of the capacity of the negative electrode 12.

The chargeable and rechargeable SOC region of the negative electrode 12 indicates a region in which the potential does not vary or slightly decreases. When the chargeable and rechargeable SOC region of the negative electrode 12 is shifted toward the high capacity side, the SOC value capable of stably obtaining a constant potential between the positive electrode 11 and the negative electrode 12 is also shifted toward the high capacity side.

When the capacity ration becomes not less than 1.1, it is possible to avoid the chargeable and rechargeable SOC region (in which the voltage of the lithium-ion rechargeable battery 1 is not less than its lower limit voltage) of the negative electrode 12 from being overlapped with the low SOC region of the positive electrode 11. As a result, this makes it possible to perform the charge and discharge of the lithium-ion rechargeable battery 1 at a low resistance of the positive electrode 11. That is, the lithium-ion rechargeable battery 1 according to the first exemplary embodiment provides the improved effect capable of suppressing the battery performance from deteriorating in the low SOC region of the lithium-ion rechargeable battery 1.

(2) Second Effect

In the lithium-ion rechargeable battery 1 according to the first exemplary embodiment, the irreversible capacity loss of the positive electrode 11 at its initial charge and discharge is smaller than the irreversible capacity loss of the negative electrode 12 at its initial charge and discharge.

As previously described, the initial irreversible capacity loss of the negative electrode 12 can shift the potential curve of the negative electrode 12 toward the high capacity side as shown in FIG. 2 and FIG. 3. Similar to the negative electrode 12, the same phenomenon occurs in the positive electrode 11. That is, the irreversible capacity loss of the positive electrode 11 becomes larger than that of the positive electrode 11, and the high resistance region (low SOC region) of the positive electrode 11 becomes overlapped with the chargeable and rechargeable SOC region of the negative electrode 12. In other words, as shown in FIG. 2 and FIG. 3, the potential curve of the negative electrode 12 is shifted toward the right side (to approach the SOC of zero %). That is, the charge and discharge of the lithium-ion rechargeable battery 1 is performed in the high resistance region (low SOC region) of the positive electrode 11. This deteriorates the battery performance of the lithium-ion rechargeable battery 1 due to the resistance of the positive electrode 11.

On the other hand, because of having the improved structure previously described, the lithium-ion rechargeable battery 1 according to the first exemplary embodiment can reliably performs its charge and discharge in the low resistance region.

(3) Third Effect

The lithium-ion rechargeable battery 1 according to the first exemplary embodiment has the negative electrode 12 made of carbon material capable of intercalating and deintercalating lithium ions. The lithium-ion rechargeable battery 1 according to the first exemplary embodiment can provide the effects previously described. Further, this improved structure of the lithium-ion rechargeable battery 1 can adjust simply the capacity of the negative electrode 12.

(4) Fourth Effect

The lithium-ion rechargeable battery 1 according to the first exemplary embodiment has the lower limit voltage (X [V]) within a range of $2.5 \leq X \leq 3.0$ and the OCP (an open circuit potential) of the negative electrode 12 is not less than $(2.7-X)$ [V] when the lithium-ion rechargeable battery 1 reaches the lower limit voltage.

As previously described, the battery voltage of the lithium-ion rechargeable battery 1 is a difference between the potential curve of the positive electrode 11 and the potential curve of the negative electrode 12.

When the lower limit voltage X [V] of the lithium-ion rechargeable battery 1 has the range of $2.5 \leq X \leq 3.0$, the battery voltage of the lithium-ion rechargeable battery 1 can have a voltage which is not less than the lower limit voltage of $2.5 \leq X \leq 3.0$ [V]. This makes it possible for the lithium-ion rechargeable battery 1 to provide a high battery performance.

Further, the OCP of the negative electrode 12 when the battery voltage of the lithium-ion rechargeable battery 1 has reached the lower limit voltage becomes within this range. This makes it possible for the lithium-ion rechargeable battery 1 to charge and discharge even if the negative electrode 12 has a low resistance.

Figure 4:
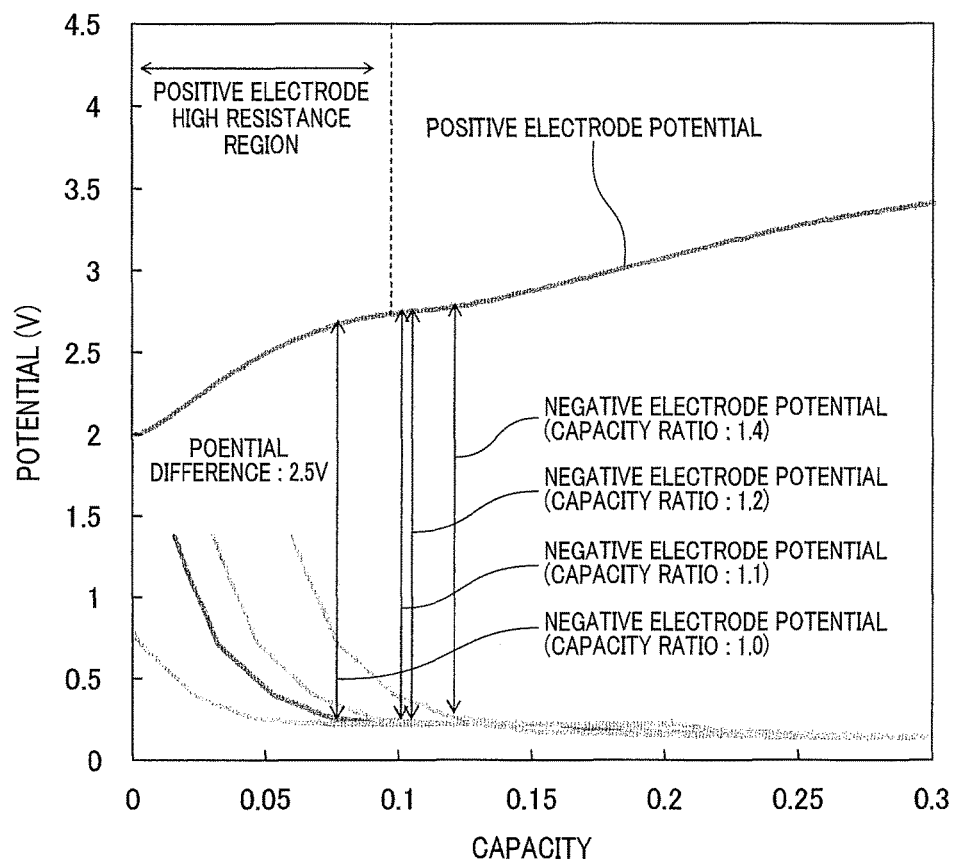
FIG. 4 is a graph showing a relationship between a capacity and potential of the positive electrode and the negative electrode and a voltage of the non-aqueous electrolyte rechargeable battery according to the first exemplary embodiment shown in FIG. 1.

FIG. 4 is a graph showing a relationship of a capacity and potential of the positive electrode 11 and the negative electrode 12, and a voltage of the non-aqueous electrolyte rechargeable battery 1 according to the first exemplary embodiment shown in FIG. 1.

As shown in FIG. 4, in the low SOC region, the potential of the positive electrode 11 and the negative electrode 12 increases or decreases. The lower limit voltage X [V] of the lithium-ion rechargeable battery 1 corresponds to the potential difference of 2.5 V shown in FIG. 4. As shown in FIG. 4, the SOC of the positive electrode 11 which provides the potential difference of 2.5 V varies due to the capacity of the negative electrode 12. That is, when the OCP of the negative electrode 12 becomes not less than $(2.7-X)$ [V], it is possible to prevent the SOC of the positive electrode 11 when the lithium-ion rechargeable battery 1 reliably reaches the lower limit voltage X [V] from being overlapped with the high resistance region.

That is, this structure makes it possible for the lithium-ion rechargeable battery 1 to provide the improved effects previously described.

(5) Fifth Effect

In the lithium-ion rechargeable battery 1 according to the first exemplary embodiment, the predetermined SOC is not more than 10% SOC. This structure makes it possible for the lithium-ion rechargeable battery 1 to provide the improved effects previously described.

(6) Sixth Effect

The positive electrode 11 in the lithium-ion rechargeable battery 1 according to the first exemplary embodiment has the SOC which is not less than the predetermined SOC when the voltage of the lithium-ion rechargeable battery 1 reaches the lower limit voltage. This structure makes it possible to suppress the positive electrode 11 from using its high resistance region when the lithium-ion rechargeable battery 1 charges and discharges. As a result, it is possible for the lithium-ion rechargeable battery 1 to reliably charge and discharge in its low resistance state.

(7) Seventh Effect

The lithium-ion rechargeable battery 1 according to the first exemplary embodiment uses the lithium-ion transition metal oxide having a structure expressed by the formula of $Li_2Ni_\alpha M^1_\beta M^2_\gamma Mn_\eta O_{4-\epsilon}$, where $0.50 < \alpha <= 1.33$, $0.33 <= \gamma <= 1.1$, $0 <= \eta <= 1.00$, $0 <= \beta <= 0.67$, $0 <= \epsilon <= 1.00$, $M^1$ is at least one of Co and Ga, and $M^2$ is at least one of Ge, Sn and Sb.

It is possible to provide the improved effects previously described when the lithium-ion rechargeable battery 1 uses, as the positive electrode active material, the lithium-ion transition metal oxide expressed by the formula previously described.

Second Exemplary Embodiment

A description will be given of the lithium-ion rechargeable battery according to the second exemplary embodiment with reference to FIG. 5 and FIG. 6.

Figure 5:
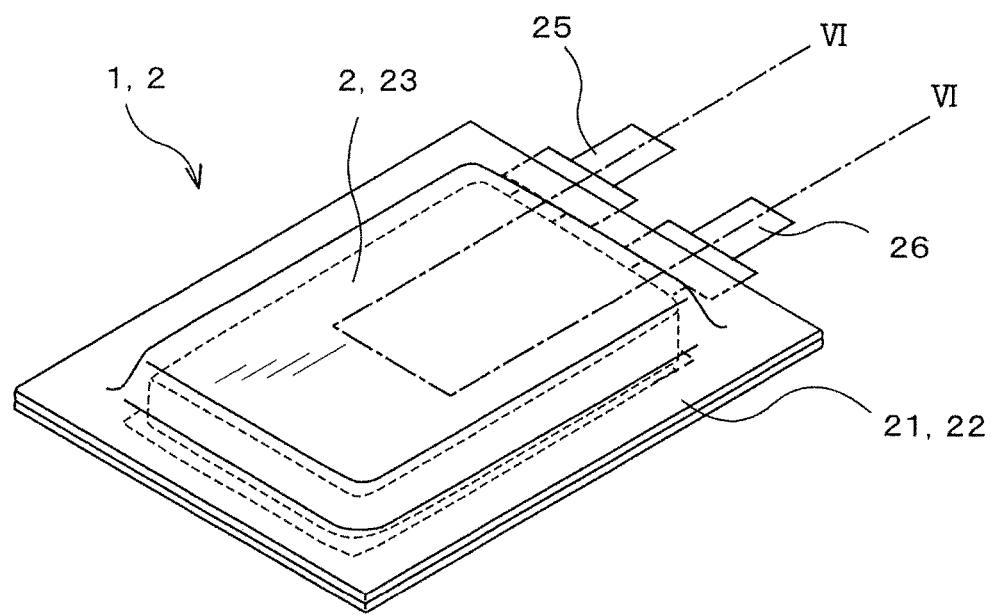
FIG. 5 is a perspective view showing a schematic structure of the non-aqueous electrolyte rechargeable battery according to second and fifth exemplary embodiments of the present invention.

FIG. 5 is a perspective view showing a schematic structure of the non-aqueous electrolyte rechargeable battery according to the second and fifth exemplary embodiments. FIG. 6 is a perspective view showing another schematic structure of the non-aqueous electrolyte rechargeable battery according to the second and fifth exemplary embodiments. That is, FIG. 6 shows a cross section along the line VI-VI shown in FIG. 5.

The positive electrode 11, the negative electrode 12 and the non-aqueous electrolyte 13, etc. in the lithium-ion rechargeable battery 1 according to the second exemplary embodiment have the same structure as those in the lithium-ion rechargeable battery 1 according to the first exemplary embodiment.

In the lithium-ion rechargeable battery 1 according to the second exemplary embodiment, the positive electrode 11 and the negative electrode 12 are accommodated and sealed in the battery casing 2. That is, the lithium-ion rechargeable battery 1 according to the second exemplary embodiment has the same structure as that of the first exemplary embodiment.

The positive electrode 11 has a structure in which the positive electrode active material layer 111 is formed on the surface of the positive electrode current collector 110 having a rectangle-like shape. A non-applied section 112 (on which no positive electrode active material layer 111 is formed) is formed on one side of the positive electrode 11 having a rectangle shape from which the positive electrode current collector 110 is exposed.

The negative electrode 12 has a structure in which the negative electrode active material layer 121 is formed on both the surfaces of the negative electrode current collector 120 having a rectangle-like shape. A non-applied section 122 (on which no negative electrode active material layer 121 is formed) is formed on one side of the negative electrode 12 having a rectangle shape from which the negative electrode current collector 120 is exposed.

In the structure of the negative electrode 12, the negative electrode active material layer 121 is larger in area than the positive electrode active material layer 111 of the positive electrode 11. When the negative electrode active material layer 121 of the negative electrode 12 and the positive electrode active material layer 111 are overlapped together, the negative electrode active material layer 121 completely covers the positive electrode active material layer 111 of the positive electrode 11 and the positive electrode active material layer 111 is not exposed from the negative electrode active material layer 121.

The positive electrode 11 and the negative electrode 12 are stacked through the separator 14. The positive electrode 11, the negative electrode 12, the separator 14 and the non-aqueous electrolyte 13 are accommodated in the battery casing 2 and sealed. The battery casing 2 is made of a laminate film. The separator 14 is larger in area than the negative electrode active material layer 121.

The positive electrode 11 and the negative electrode 12 are stacked to make a laminate so that the center point of the positive electrode active material layer 111 coincides with the center point of the negative electrode active material layer 121. In this structure, the non-applied section 112 of the positive electrode 11 is arranged opposite in direction to the non-applied section 122 of the negative electrode 12.

[Battery Casing]

The battery casing 2 is made of the laminated film 20. The laminated film 20 is composed of a plastic resin layer 201 and has a predetermined shape, a metal foil 202 and a plastic resin layer 203 which have been stacked to make a laminate. The battery casing 2 is produced by softening the plastic resin layers 201 and 203 in the laminated film 20 by using heat energy or solvent, and pressing the softened laminated film 20 onto another laminated film which has been softened. This process bonds the laminated film 20 and another laminated film together.

The battery casing 2 is produced by stacking the laminated films 20 having the predetermined shape to accommodate the positive electrode 11 and the negative electrode 12, and bonding the edge section of the outer periphery of the laminated films 20 to seal the positive electrode 11 and the negative electrode 12 in the battery casing 2. The second exemplary embodiment performs a heat sealing process at the outer periphery of the laminated films 20 to completely seal the battery casing 20.

That is, the battery casing 2 is produced by superimposing the laminated film (first laminated film) 20 and another laminated film (second laminated film 20) together. The second laminated film 20 indicates a laminated film to be heat sealed. It is also acceptable to use a single laminated film to produce the battery casing.

The process of heat-sealing the outer periphery of the battery casing 2 is performed in a decreased-pressure atmosphere (or in vacuum) or in an inert gas atmosphere (in noble gas, preferable in Ar gas atmosphere). This process prevents material which would deteriorate the electrode performance from penetrating and entering the inside of the battery casing 2. Accordingly, the electrodes such as the positive electrode 11 and the negative electrode 12 are completely sealed in the inside of the battery casing 2 without air (and moisture included in air).

Figure 6:
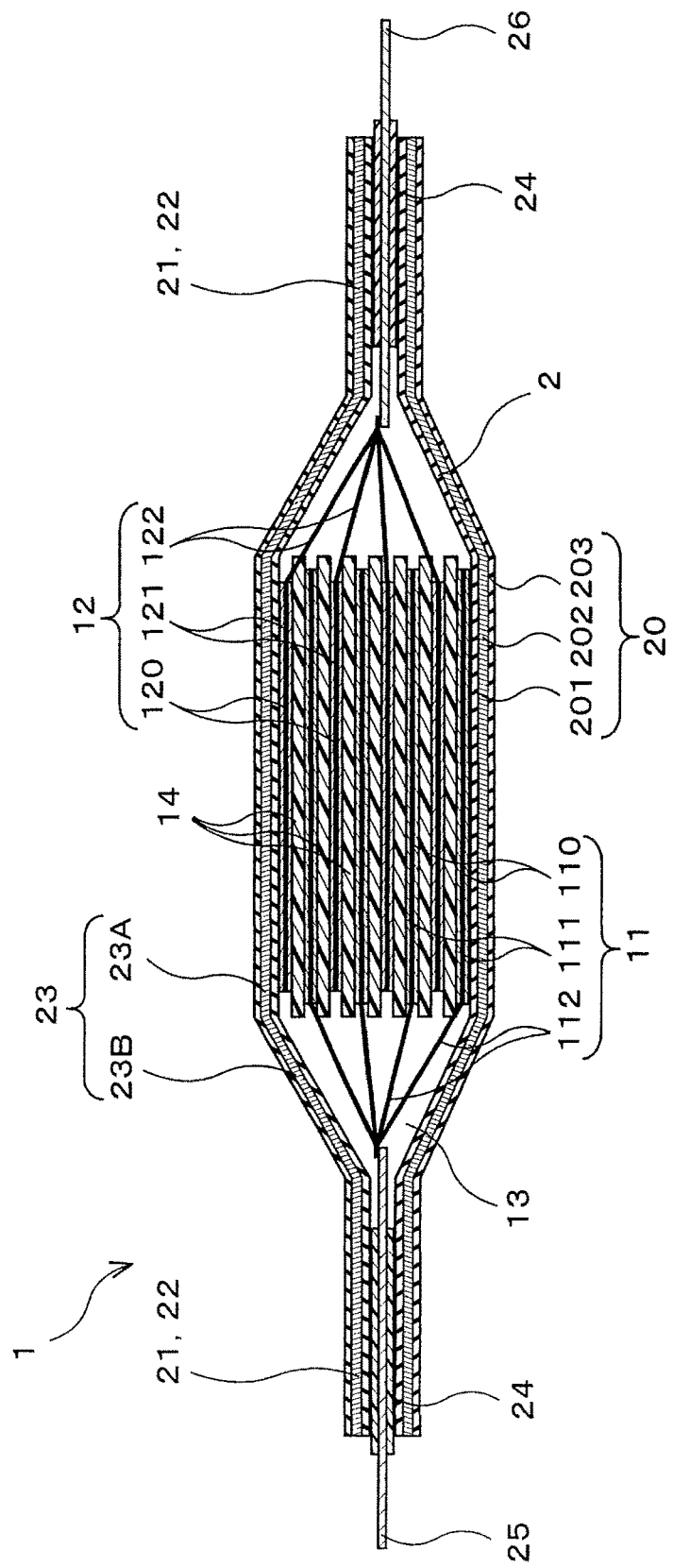
FIG. 6 is a perspective view showing another schematic structure of the non-aqueous electrolyte rechargeable battery according to the second and fifth exemplary embodiments of the present invention.

As shown in FIG. 5 and FIG. 6, the laminated film 20 which has been prepared has a plate section 21 and an embossed part 23 having a bath-shape. This plate section 21 forms a sealed section between the laminated film 20 with another laminated film 20 which have been stacked. The embossed part 23 is formed at a center section of the laminated film 20, and accommodates the positive electrode 11 and the negative electrode 12.

As shown in FIG. 5 and FIG. 6, both the laminated films 20 are formed to have the embossed part 23 to accommodate the positive electrode 11 and the negative electrode 12. When both the laminated films 20 have the same shape and are completely stacked face with each other, both the plate parts 21 are completely overlapped together without displacement.

In the laminated films 20, the plate section 21 and a bottom section 23A of the embossed part 23 (as the bath-shape) are formed parallel with each other. The bottom section 23A corresponds to the edge part in the stacked direction in the lithium-ion rechargeable battery 1 according to the second exemplary embodiment.

The plate section 21 is connected to the bottom section 23A of the embossed part 23 by an inclined section 23B. The inclined section 23B extends in a direction (inclined direction) which crosses a direction parallel to the plate section 21 and the bottom section 23A. The bottom section 23A is formed smaller than an opening section (which is formed at an edge section inside of the plate section 21 of the embossed part 23.

In the battery casing 2, a seal section 22 is formed at the outer periphery of both the plate sections 21. A non-sealed section is formed in the inside (to the direction close to the electrolyte) of the seal section 22. In the non-sealed section, the plate sections 21 are overlapped together. It is acceptable to be in contact with the non-sealed section in which the plate sections 21 are overlapped, or to form a gap in this non-sealed section.

Further, it is acceptable to arrange the non-applied sections 112 and 122 of the electrode plates (the plate of the positive electrode plate 11 and the plate of the negative electrode 12) and the separator 14 in the non-sealed section. The laminated films 20 are shaped in advance to fit the shape shown in FIG. 5 and FIG. 6. It is possible to shape the laminated films 20 by using a conventional forming method. In the lithium-ion rechargeable battery 1, the positive electrode 11 and the negative electrode 12 are connected to a positive electrode terminal 25 and a negative electrode terminal 26, respectively.

[Electrode Terminal]

The positive electrode terminal 25 is electrically connected to the non-applied section 112 of the positive electrode 11. Similarly, the negative electrode terminal 26 is electrically connected to the non-applied section 12 of the negative electrode 12.

In the lithium-ion rechargeable battery 1 according to a first exemplary embodiment, the positive electrode terminal 25 and the negative electrode terminal 26 are connected to the non-applied section 112 of the positive electrode 11 and the non-applied section 122 of the negative electrode 12, respectively by welding.

The center part in a wide direction of the non-applied section 112 of the positive electrode 11 and the non-applied section 122 of the negative electrode 12 is connected to the positive electrode terminal 25 and the negative electrode terminal 26, respectively.

A part of each of the positive electrode terminal 25 and the negative electrode terminal 26, which penetrates the battery casing 2 and are exposed outside, is bonded through a sealant 24 so as to seal the plastic resin layer 201 of the laminated film 20 and the electrode terminals 25 and 26 are completely sealed.

Each of the positive electrode terminal 25 and the negative electrode terminal 26 is made of metal sheet. The sealant 24 covers the part at which the positive electrode terminal 25 and the negative electrode terminal 26 are overlapped with the plate section 21. Because each of the positive electrode terminal 25 and the negative electrode terminal 26 has a sheet-like shape, this structure makes it possible to reduce stress which would deform the laminated film 20 at the part in which the positive electrode terminal 25 and the negative electrode terminal 26 penetrate the battery casing 2. It is also possible to easily weld the non-applied sections 112 of the positive electrode 11 and the positive electrode terminal 25, and weld the non-applied sections 122 of the negative electrode 12 and the negative electrode terminal 26.

It is preferable for the lithium-ion rechargeable battery 1 of a laminate type according to the second exemplary embodiment to have a restraint member, which is capable of suppressing the positive electrode 11 and the negative electrode 12 from separating away from with each other. Use of the restraint member makes it possible to suppressing a distance between the positive electrode 11 and the negative electrode 12 in a stacked direction from prolonging.

If the distance between the positive electrode 11 and the negative electrode 12 is prolonged, a diffusion length of electrolyte ions increases, and as a result, this increases an internal resistance of the lithium-ion rechargeable battery 1. Use of the restraint member can suppress the distance between the positive electrode 11 and the negative electrode 12 from prolonging.

For example, it is possible to use as the restraint member a member having a pair of jigs which are in contact with both the outer peripheral surfaces in the stacked direction of the lithium-ion rechargeable battery 1 of a laminate type. It is acceptable to use, as the restraint member, a member having a pair of jigs which is capable of pressing the outer peripheral surface of the lithium-ion rechargeable battery 1 of a laminate type, or a member having a pair of jigs which is capable of suppressing the thickness of the lithium-ion rechargeable battery 1 of a laminate type from increasing. It is also acceptable to use as the restraint member an outer casing having a predetermined rigidity for accommodating the lithium-ion rechargeable battery 1 of a laminate type.

[Effects]

The shape of the lithium-ion rechargeable battery 1 according to the second exemplary embodiment is different from that of the lithium-ion rechargeable battery 1 according to the first exemplary embodiment. In addition, the lithium-ion rechargeable battery 1 according to the second exemplary embodiment having the improved structure previously described has the same effects and behavior of the lithium-ion rechargeable battery 1 of a laminate type according to the first exemplary embodiment.

Third Exemplary Embodiment

Figure 7:
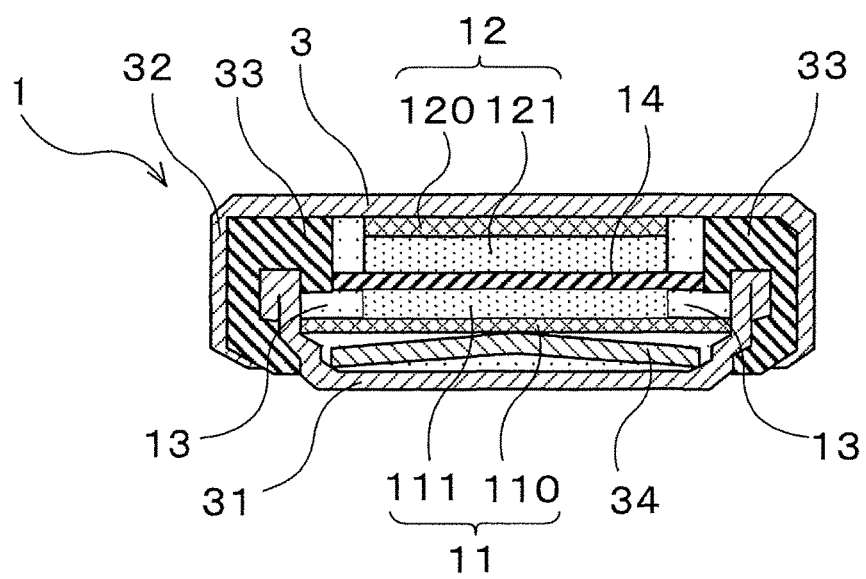
FIG. 7 is a view showing a schematic cross section of a non-aqueous electrolyte rechargeable battery according to third and sixth exemplary embodiments of the present invention.

A description will be given of the lithium-ion rechargeable battery according to the third exemplary embodiment with reference to FIG. 7. FIG. 7 is a view showing a schematic cross section of the lithium-ion rechargeable battery 1 as a non-aqueous electrolyte rechargeable battery according to the third and sixth exemplary embodiments. The sixth exemplary embodiment will be explained later.

The lithium-ion rechargeable battery 1 according to the third exemplary embodiment is a coin shape rechargeable battery. Each of the positive electrode 11, the negative electrode 12 and the non-aqueous electrolyte 13 in the lithium-ion rechargeable battery 1 according to the third exemplary embodiment has the same structure as those of the lithium-ion rechargeable battery 1 according to the first exemplary embodiment.

In the structure of the lithium-ion rechargeable battery 1 according to the third exemplary embodiment, the battery casing 3 accommodates the positive electrode 11 and the negative electrode 12. That is, the positive electrode 11 and the negative electrode 12 are sealed in the battery casing 3. Other components of the lithium-ion rechargeable battery 1 according to the third exemplary embodiment have the same structure as those according to the first and second exemplary embodiments as explained below.

Specifically, the lithium-ion rechargeable battery 1 according to the third exemplary embodiment has the positive electrode 11, the negative electrode 12, the non-aqueous electrolyte 13, the separator 14, a positive electrode casing 31, a negative electrode casing 32, a sealing member 33 and a supporting member 34.

In the structure of the lithium-ion rechargeable battery 1 according to the third exemplary embodiment, built-in components are completely sealed by the positive electrode casing 31 and the negative electrode casing 32. In other words, the positive electrode casing 31 and the negative electrode casing 32 accommodate the built-in components. The built-in components contain the positive electrode 11, the negative electrode 12, the non-aqueous electrolyte 13, the separator 14 and the supporting member 34. For example, it is possible to use a gasket as the sealing member 33.

As shown in FIG. 7, the positive electrode 11, the separator 14, and the negative electrode 12 are arranged in the positive electrode casing 31 and the negative electrode casing 32 so that the positive electrode active material layer 111 faces the negative electrode active material layer 121 through the separator 14.

As shown in FIG. 7, the positive electrode active material layer 111 is arranged in surface contact with and electrically connected to the positive electrode current collector 110 in the positive electrode casing 31. Similarly, the negative electrode active material layer 121 is arranged in surface contact with and electrically connected to the negative electrode current collector 120 in the negative electrode casing 32.

[Effects]

The shape of the lithium-ion rechargeable battery 1 according to the third exemplary embodiment is different from that of the lithium-ion rechargeable battery 1 according to the first exemplary embodiment. The components and behavior of the lithium-ion rechargeable battery 1 according to the third exemplary embodiment are the same as those of the lithium-ion rechargeable battery 1 according to the first exemplary embodiment.

It is possible to apply the lithium-ion rechargeable battery 1 according to the second and third exemplary embodiments to laminate type batteries and coin-shaped batteries. However, the concept of the present invention is not limited by those. It is possible to apply the lithium-ion rechargeable battery 1 to various types of battery such as having a cylindrical-shaped type, a prismatic-shaped type, etc. It is also acceptable to combine assembled lithium-ion rechargeable batteries in series or in parallel with each other.

Embodiments

A description will now be given of a method of preparing a positive electrode active material and a negative electrode active material, and producing a positive electrode, a negative electrode and lithium-ion rechargeable batteries according to first to fifth examples and first to three comparative examples.

FIRST EXAMPLE (Positive Electrode)

An aqueous solution was prepared, which contains metal complexes of each of Li, Ni, Mn and Sn. The prepared solution of metal complexes was adjusted to have a chemical composition of target positive electrode material. That is, the prepared solution of metal complexes was adjusted so that an atomic ratio of Li:Ni:Mn:Sn is 2:1:0.67:0.33.

The prepared solution of metal complexes was dried in a drying oven, and heated in order to remove organic components from the obtained solution. After this process, the obtained material was calcined and sintered. These processes produced a positive electrode active material ($Li_2NiMn_{0.67}Sn_{0.33}O_4$ powder) according to the first example.

Next, 91 parts by mass of the positive electrode active material, 6 parts by mass of the conductive material, 6 parts by mass of a binder were added to N-methylpyrrolidone (MNP) and mixed together to produce a slurry of positive electrode mixture. Acetylene black was used as the conductive material. PolyVinylidene DiFluoride (PVDF) was used as the binder. The obtained positive electrode mixture was applied on both the surfaces of a current collector made of aluminum foil having a thickness of 15 μm. The obtained current collector was dried and pressed with a predetermined pressure to produce the positive electrode 11 according to the first example.

The positive electrode active material used in the first example corresponds to a lithium-ion transition metal oxide ($Li_{2-x}Ni_\alpha M^1_\beta M^2_\gamma O_{4-\epsilon}$, where x=0, α=1, β=0, γ=1 (=0.67+0.33), $M^2$: Mn and Sn, and ε=0.

(Negative Electrode)

98 parts by mass of graphite powder, 1 parts by mass of styrene-butadiene rubber (SBR) as a binder, and 1 parts by mass of carboxymethyl cellulose (CMC) as another binder were added to water and mixed together to produce a slurry of negative electrode mixture. The CMC as the binder was solved in water and a solid content of the CMC in water becomes 1 parts by mass. The obtained negative electrode mixture was applied on both the surfaces of a current collector made of copper foil having a thickness of 10 μm. The obtained negative electrode current collector was dried and pressed with a predetermined pressure to produce the negative electrode 12 according to the first to fifth examples.

The negative electrode mixture was applied on both the surfaces of the current collector made of copper foil so that an applied amount of the negative electrode mixture and the capacity ratio (capacity of the negative electrode 12/the capacity of the positive electrode 11) per unit area becomes 1.1.

(Non-Aqueous Electrolyte)

A solution was prepared as the non-aqueous electrolyte 13, which contained a mixture solution in which 1 mol % of $LiPF_6$ was dissolved in a mixture solvent having a relationship of ethylene carbonate (EC):diethyl carbonate (DCE) of 30:70 (vol %). 2 mass % of vinylene carbonate (VC) was added to the non-aqueous electrolyte 13 when the overall of the non-aqueous electrolyte 13 was 100 mass %.

(Lithium-Ion Rechargeable Battery or Secondary Battery)

As previously described in detail, the lithium-ion rechargeable battery 1 has the structure in which the positive electrode 11, the separator 14, and the negative electrode 12 are stacked in this order. This stacked components is a stacked body. The obtained stacked body and the non-aqueous electrolyte 13 are accommodated with the non-aqueous electrolyte 13 in the battery casing 2 of a laminate type, specifically, after injecting the non-aqueous electrolyte 13 into the battery casing 2 in which the stacked body is stored. After this process, the battery casing 2 was completely sealed by using heat sealing. The number of the stacked bodies accommodated in the battery casing 2 is adjusted to have a battery capacity of 3 [Ah], where each of the stacked bodies consists of the positive electrode 11, the separator 14 and the negative electrode 12.

A porous film made of polyethylene having a thickness of 25 μm was used as the separator 14.

The battery casing 2 is made of laminate film 20 consisting of a polypropylene layer 201, an aluminum foil 202, and a polyethylene terephthalate layer 203.

After assembly previously described, CC charge (Constant Current charge) of the lithium-ion rechargeable battery 1 was performed at room temperature until the 4.1 [V] cut-off voltage, and CC discharge (Constant Current discharge) thereof was performed at room temperature until the 2.5 [V] cut-off voltage. That is, the activation of the lithium-ion rechargeable battery 1 was performed by charge and discharge at 1/3 C×5 cycles.

SECOND EXAMPLE

The lithium-ion rechargeable battery 1 was used as in the second example, in which a ratio of an amount of the negative electrode mixture was applied and a capacity ratio (capacity of the negative electrode 12/the capacity of the positive electrode 11) per unit area becomes 1.2. Other components of the lithium-ion rechargeable battery 1 according to the second example are the same as those of the lithium-ion rechargeable battery 1 according to the first example.

THIRD EXAMPLE

The lithium-ion rechargeable battery 1 was used as the third example, in which a ratio of an amount of the negative electrode mixture was applied and a capacity ratio (capacity of the negative electrode 12/the capacity of the positive electrode 11) per unit area becomes 1.4. Other components of the lithium-ion rechargeable battery 1 according to the third example are the same as those of the lithium-ion rechargeable battery 1 according to the first example.

FIRST COMPARATIVE EXAMPLE

The lithium-ion rechargeable battery 1 was used as the first comparative example, in which a ratio of the amount of the negative electrode mixture was applied and capacity ratio (capacity of the negative electrode 12/the capacity of the positive electrode 11) per unit area becomes 1.0. Other components of the lithium-ion rechargeable battery 1 according to the first comparative example are the same as those of the lithium-ion rechargeable battery 1 according to the first example.

FOURTH EXAMPLE

The lithium-ion rechargeable battery 1 used, as the positive electrode active material, a powder having a chemical composition expressed by the formula of $Li_2Ni_{0.67}Co_{0.67}Mn_{0.33}Sn_{0.33}O_4$. Other components of the lithium-ion rechargeable battery 1 according to the fourth example were the same as those of the lithium-ion rechargeable battery 1 according to the first example.

The positive electrode active material was produced by using the metal complex mixture solution to have an atomic ratio of Li:Ni:Co:Mn:Sn becomes 2:0.67:0.67:0.33:0.33.

The positive electrode active material used in the fourth example corresponds to the lithium-ion transition metal oxide expressed by the formula of $(Li_{2-x}Ni_\alpha M^1_\beta M^2_\gamma O_{4-\epsilon})$, where x=0, α=0.67, $M^1$: Co, β=0.67, γ=0.66 (=0.33+0.33), $M^2$: Mn and Sn, and ε=0.

SECOND COMPARATIVE EXAMPLE

The second comparative example used, as the positive electrode active material, a powder having a chemical composition expressed by the formula of $Li_2Ni_{0.67}Co_{0.67}Mn_{0.33}Sn_{0.33}O_4$. Other components of the lithium-ion rechargeable battery 1 according to the second comparative example were the same as those of the lithium-ion rechargeable battery 1 according to the first comparative example.

The lithium-ion rechargeable battery 1 according to the second comparative example and the lithium-ion rechargeable battery 1 according to the fourth example used the same positive electrode active material.

FIFTH EXAMPLE

The fifth example used, as the positive electrode active material, a powder having a chemical composition expressed by the formula of $Li_2NiMn_{0.67}Ge_{0.33}O_4$. Other components of the lithium-ion rechargeable battery 1 according to the fifth example were the same as those of the lithium-ion rechargeable battery 1 according to the first example.

In the production of the positive electrode active material used in the lithium-ion rechargeable battery 1 according to the fifth example, a solution was prepared, which contains metal complexes of each of Li, Ni, Mn and Ge. The prepared solution of metal complexes was adjusted to have a chemical composition of target positive electrode material. That is, the prepared solution of metal complexes was adjusted so that an atomic ratio of Li:Ni:Mn:Ge becomes 2:1:0.67:0.33. Similar to the first example, the prepared solution of metal complexes was dried in a drying oven, and heated in order to remove organic components from the obtained solution. After this, the obtained material was calcined and sintered. These processes produced the positive electrode active material ($Li_2NiMn_{0.67}Ge_{0.33}O_4$ powder).

The positive electrode active material used in the fifth example corresponds to a lithium-ion transition metal oxide ($Li_{2-x}Ni_\alpha M^1_\beta M^2_\gamma O_{4-\epsilon}$, where x=0, α=1, β=0, γ=1.00 (=0.67+0.33), $M^2$: Mn and Ge, and ε=0.

THIRD COMPARATIVE EXAMPLE

The third comparative example used, as the positive electrode active material, a powder having a chemical composition expressed by the formula of $Li_2NiMn_{0.67}Ge_{0.33}O_4$. Other components of the lithium-ion rechargeable battery 1 according to the third comparative example were the same as those of the lithium-ion rechargeable battery 1 according to the first comparative example.

[Evaluation]

A description will now be given of evaluation of each of the first to fifth examples and the first to third comparative examples.

Prior to the evaluation of the lithium-ion rechargeable battery 1 according to the first to fifth examples and the first to third comparative examples, performance of the positive electrode 11 and the negative electrode 12 thereof were evaluated.

The evaluation of each of the positive electrode 11 and the negative electrode 12 was performed by using a test cell of a half-cell type. The following measurement method will be explained for the positive electrode 11. It is possible to evaluate performance of the negative electrode 11 by using the same following measurement method.

The test cell of a half-cell type has a structure of the coin type battery according to the third exemplary embodiment shown in FIG. 7. In the evaluation of the positive electrode 11, metallic lithium was used as the negative electrode 12. Similarly, in the evaluation of the negative electrode 12, metallic lithium was also used as the positive electrode 12.

The test cell of a half-cell type used the non-aqueous electrolyte 13 which was used in the lithium-ion rechargeable battery 1 according to the first to fifth examples and the first to third comparative examples.

After assembling, the CC charge of the test cell of a half-cell type to be used for evaluation of the positive electrode 11 was performed at room temperature until the 4.3 [V] cut-off voltage, and the CC discharge thereof was performed at room temperature until the 3.0 [V] cut-off voltage. The activation of the lithium-ion rechargeable battery 1 was performed by 1/3 C×5 cycles.

Similar to the evaluation of the positive electrode 11 previously described, after being assembled, the CC discharge for the test cell of a half-cell type to be used for evaluation of the negative electrode 12 was performed at room temperature until the 0.01 [V] cut-off voltage, and the CC charge thereof was performed at room temperature until the 2.0 [V] cut-off voltage. The activation of the positive electrode 11 was performed by 1/10 C×5 cycles.

In the lithium-ion rechargeable battery 1 according to the first to fifth examples and the first to third comparative examples to be evaluated, the positive electrode 11 was a working electrode (WE), and the negative electrode 12 was a counter electrode (CE), and a reference electrode (RE) made of lithium metal was used to form a three-electrode type cell.

After assembly of the three-electrode type cell, the activation of the three-electrode type cell was performed at room temperature at 1/3 C×5 cycles, i.e. the CC charge thereof was performed until the 4.1 [V] cut-off voltage, and the CC discharge thereof was performed until the 2.5 [V] cutoff voltage.

(Measurement of Capacity of Positive Electrode)

The charge and discharge of the test cell of a half-cell type was performed at the rate of 1/3 C CC. The CC charge thereof was performed until the 4.3 V cut-off voltage, and the CC discharge thereof was performed until the 2.0 V cut-off voltage. The obtained discharge capacity was used as the battery capacity of the test cell, and the capacity of the positive electrode 11. Table 1 shows the measurement results of those test cells of a half-cell type.

(Confirmation of Potential-Battery Capacity of Positive Electrode)

The CC charge of each test cell of a half-cell type according to the first to fifth examples and the first to third comparative examples was performed at the rate of 1/3 C until the 4.3 V cut-off voltage in order to reach a full-charged state thereof. After this charge, the CC discharge of a predetermined capacity of each test cell was performed in order to reach a target SOC value. After the adjustment of the SOC, a potential of each electrode at the predetermined SOC was evaluated to obtain a relationship in potential between the positive electrode potential and the SOC of the positive electrode. FIG. 2 and FIG. 3 show the graphs regarding the evaluated relationship.

(Confirmation of Positive Electrode Resistance)

The CC charge of each test cell of a half-cell type according to the first to fifth examples and the first to third comparative examples was performed at the rate of 1/3 C until the 4.3 [V] cut-off voltage to reach the full charged state thereof. After this charge, the CC discharge of a predetermined capacity of each test cell was performed in order to reach a target SOC value. After the adjustment of the SOC, each test cell was charged at the rate of 1/2 C, and a voltage value of each test cell after the elapse of 10 seconds was measured. Similarly, each test cell was charged at 1 C and 3 C and a voltage value of each test cell after elapse of 10 seconds was measured. A resistance of each test cell was calculated by the least-rectangle method using the charge current value and the measured voltage of each test cell. The calculated resistance value indicates the resistance of each test cell, i.e. the resistance of the positive electrode 11. Table 1 shows the resistance of the positive electrode 11 of each test cell as the calculation results.

(Confirmation of Resistance Ratio of Positive Electrode)

An input resistance of each test cell of a half-cell type according to the first to fifth examples and the first to third comparative examples was measured at 0% SOC of a single pole (i.e., the resistance of the positive electrode 11 of each test cell) was measured. Further, an input resistance of each test cell of a half-cell type at 10% SOC of the single pole (i.e., the resistance of the positive electrode 11 of each test cell) was measured. A resistance ratio between the two resistance values of the positive electrode 11 was calculated when the SOC was 0% and 10% was calculated. Table 1 shows those calculation results of the resistance ratio. The 10% SOC corresponds to an SOC which is not less than the predetermined SOC previously described.

(Capacity Ratio (Capacity of the Negative Electrode 12/the Capacity of the Positive Electrode 11))

Similar to the method of measuring the capacity of the positive electrode 11, the capacity of the negative electrode 12 of each of the first to fifth examples and the first to third comparative examples was measured. Further, a capacity ratio (capacity of the negative electrode 12/the capacity of the positive electrode 11) was calculated. Table 1 shows those calculation results of the capacity ratio.

(Measurement of Battery Capacity of Lithium-Ion Rechargeable Battery)

The charge and discharge of the lithium-ion rechargeable battery according to the first to fifth examples and the first to third comparative examples was performed at the rate of 1/3 C. That is, the CC charge thereof was performed until the 4.1 [V] cut-off voltage, and the CC discharge was performed until the 2.5 [V] cut-off voltage.

(Confirmation of Resistance of Lithium-Ion Rechargeable Battery)

The CC charge of each of the first to fifth examples and the first to third comparative examples was performed at the rate of 1/3 C until the 4.1 [V] cut-off voltage to reach the full charged state thereof. After this, the CC discharge of the predetermined capacity of each example was performed to obtain the target SOC. After the adjustment of the SOC of each example, the discharge was performed at the rate of 1/2 C for 10 seconds. After the elapse of 10 seconds, a battery voltage of each example was measured. Similarly, a voltage of each example was measured at the rate of 1 C and 3 C, and a value of each example after elapse of 10 seconds was measured. A resistance of each example was calculated by the least-rectangle method using the charge current value and the measured voltage of each example. The calculated resistance value indicates the resistance of the lithium-ion rechargeable battery according to each example.

(Confirmation of Resistance Ratio of Lithium-Ion Rechargeable Battery)

An input resistance of each example was measured at 10% of its SOC. Further, an input resistance of each example was measured at zero % of its SOC. A resistance ratio of each example was calculated on the basis of the measured resistances. Table 1 shows the calculation results of the resistance ratio of each example.

(SOC of Positive Electrode)

A SOC of positive electrode of each example as a three electrode type cell was measured when the SOC of each example was zero %. Table 1 shows the measured SOC of the positive electrode of each example.

(Irreversible Capacity Loss)

A relationship in irreversible capacity loss between the positive electrode and the negative electrode of the test cells of a half-cell type was compared. The Table 1 shows the comparison results of the relationship thereof.

(OCP of Negative Electrode)

An OCP of the negative electrode of each example as a three electrode type cell was measured when the SOC of each example was zero %. Table 1 shows the measured OCP of the negative electrode of each example.

That is, the lithium-ion rechargeable battery 1 according to the first to third comparative examples has high input resistance in a low SOC region within a range of 0 to 10%. Increasing of the input resistance of the lithium-ion rechargeable battery 1 deteriorates its battery performance in the low SOC region.

This drawback can be recognized from the results of the SOC of the positive electrode 11. Specifically, the positive electrode 11 has the SOC of 7% when the lithium-ion rechargeable battery 1 according to the first to third comparative examples has the SOC of 0%.

The SOC of 7% of the positive electrode 11 corresponds to the SOC which is contained in the high resistance region (low SOC region) of the positive electrode 11. In other words, in the lithium-ion rechargeable battery 1 according to the first to third comparative examples, the low SOC region of the lithium-ion rechargeable battery 1 is contained in the high resistance region (low SOC region) of the positive electrode 11. As a result, it can be understood that the first to third comparative examples have a large resistance value ratio of the lithium-ion rechargeable battery 1 when compared with the resistance value ratio of the lithium-ion rechargeable battery 1 according to the first to fifth examples.

TABLE 1

| Examples | Positive electrode active material | Capacity ratio (capacity of negative electrode/capacity of positive electrode) | Positive electrode resistance ratio | Resistance ratio of lithium-ion rechargeable battery | Lower limit voltage of Lithium-ion rechargeable battery | SOC of positive electrode | Irreversible capacity loss, | OCP of negative electrode |
|---|---|---|---|---|---|---|---|---|
| First example | $Li_2NiMn_{0.67}Sn_{0.33}O_4$ | 1.1 | 2.8 | 1.3 | 2.5 V | 10% | N > P | 0.22 V |
| Second example | $Li_2NiMn_{0.67}Sn_{0.33}O_4$ | 1.2 | 2.8 | 1.1 | 2.5 V | 11% | N > P | 0.22 V |
| Third example | $Li_2NiMn_{0.67}Sn_{0.33}O_4$ | 1.4 | 2.8 | 1.1 | 2.5 V | 12% | N > P | 0.27 V |
| Fourth example | $Li_2Ni_{0.67}Co_{0.67}Mn_{0.33}Sn_{0.33}O_4$ | 1.2 | 4.4 | 1.2 | 2.5 V | 11% | N > P | 0.22 V |
| Fifth example | $Li_2NiMn_{0.67}Ge_{0.33}O_4$ | 1.2 | 2.9 | 1.1 | 2.5 V | 11% | N > P | 0.22 V |
| First comparative example | $Li_2NiMn_{0.67}Sn_{0.33}O_4$ | 1 | 2.8 | 1.8 | 2.5 V | 7% | N < P | 0.18 V |
| Second comparative example | $Li_2Ni_{0.67}Co_{0.67}Mn_{0.33}Sn_{0.33}O_4$ | 1 | 4.4 | 2.3 | 2.5 V | 7% | N < P | 0.18 V |
| Third comparative example | $Li_2NiMn_{0.67}Ge_{0.33}O_4$ | 1 | 2.9 | 1.8 | 2.5 V | 7% | N < P | 0.18 V |

As shown in Table 1, each of the first to fifth examples and the first to third comparative examples has the positive electrode 11 having the positive electrode resistance ratio within a range of 2.8 to 4.4. That is, the positive electrode 11 in each of the first to fifth examples and the first to third comparative examples has the improved performance in which the resistance of the positive electrode 11 (i.e. positive electrode resistance shown in Table 1) when SOC is 0% becomes not less than twice of the positive electrode resistance when SOC is 10% (which is not less than the predetermined SOC).

Each of the first to third comparative examples, which has the ratio of 1 in capacity between the positive electrode 11 and the negative electrode 12, has its electric resistance ratio of not less than 1.8 which is a high value when compared with that of each of the first to fifth examples.

The capacity ratio of each of the first to third comparative examples indicates the ratio in capacity between the positive electrode 11 and the negative electrode 12.

On the other hand, the lithium-ion rechargeable battery 1, according to the first to fifth examples, having the capacity of not less than 1.1 can reliably and greatly suppress the input resistance of the lithium-ion rechargeable battery 1 in the low SOC region from increasing. That is, the lithium-ion rechargeable battery 1 according to the first to fifth examples can suppress the battery performance of the lithium-ion rechargeable battery 1 in the low SOC region from deteriorating.

Further, the SOC of the positive electrode according to the first to fifth examples is within a range of 10 to 20%, which is not less than 10%. The SOC value of not less than 15% of the positive electrode 11 is outside from the high resistance region (low SOC region) of the positive electrode 11. That is, the lithium-ion rechargeable battery 1 is outside from the high resistance region (low SOC region) even if the lithium-ion rechargeable battery 1 according to the first to fifth examples enters its low SOC region. That is, each of the first to fifth examples has a decreasing electric resistance ratio of the lithium-ion rechargeable battery 1.

Further, as can be understood from the results shown in Table 1, the first to fifth examples according to the present invention having different types of the positive electrode active material can have the improved effects previously described.

Fourth Exemplary Embodiment

A description will be given of the lithium-ion rechargeable battery according to the fourth exemplary embodiment with reference to FIG. 1, FIG. 7 and FIG. 8.

The lithium-ion rechargeable battery according to the fourth exemplary embodiment has been obtained as an application of the concept of the non-aqueous rechargeable battery according to the present invention. As previously described in the explanation of the first exemplary embodiment, FIG. 1 is a view which also shows the schematic structure of the lithium-ion rechargeable battery 1 according to fourth exemplary embodiment.

[Lithium-Ion Rechargeable Battery]

As shown in FIG. 1, the lithium-ion rechargeable battery 1 according to the fourth exemplary embodiment is basically composed of the positive electrode 11, the negative electrode 12, the non-aqueous electrolyte 13, the separator 14 and the battery casing 15.

In more detail, FIG. 1 shows the schematic structure of the lithium-ion rechargeable battery 1 according to the fourth exemplary embodiment in which the positive electrode 11 consists of a positive electrode current collector 110 and a positive electrode active material layer 111, the negative electrode 12 consists of a negative electrode current collector 120 and a negative electrode active material layer 121, and the battery casing 15 accommodates the positive electrode 11, the negative electrode 12, the non-aqueous electrolyte 13 and the separator 14. The positive electrode 11 faces the negative electrode 12 in the non-aqueous electrolyte 13, and the positive electrode 11 and the negative electrode 12 are insulated from each other by the separator 14.

[Positive Electrode]

As shown in FIG. 1, the positive electrode active material layer 111 is formed on a surface of the positive electrode current collector 110. The positive electrode active material layer 111 contains a positive electrode active material. Positive electrode material is a mixture of a positive electrode active material, a conductive material and a binder. The positive electrode material as the mixture is applied on a surface of the positive electrode current collector 110. The positive electrode current collector 110 on which the mixture has been applied is then dried to form the positive electrode active material layer 111. That is, it is acceptable to remove the conductive material and the binder from the mixture. The positive electrode material is a formed as a paste (or a slurry) by using an appropriate solvent. It is also acceptable to add a known additive into the positive electrode material to form the positive electrode 11.

[Positive Electrode Active Material]

The lithium-ion rechargeable battery 1 as the non-aqueous electrolyte rechargeable battery according to the fourth exemplary embodiment uses a lithium transition metal oxide as the positive electrode active material expressed by a formula of $Li_{2-x}Ni_\alpha M^1_\beta M^2_\gamma O_{4-\epsilon}$, where $0.50<\alpha<=1.33$, $0<=\beta<0.67$, $0<=\gamma<=1.33$, $0<=\epsilon<=1.00$, $M^1$ is at least one of Co, Al and Ga, and $M^2$ is at least one of Mn, Ge, Sn and Sb, and x reversibly varies within a range of $0<=x<=2$ by intercalating and deintercalating lithium ions.

The lithium transition metal oxide contains Ni, where Ni forms a local structure in which six O atoms are coordinated (6-coordinated local structure). This structure makes it possible to provide stable charge and discharge. Further, because a large amount of Ni as oxidation-reduction species are contained within a range of $0.50<\alpha<=1.33$, this provides high capacity of the lithium-ion rechargeable battery 1 as the non-aqueous electrolyte rechargeable battery according to the fourth exemplary embodiment.

Still further, because a large amount of the $M^1$ and $M^2$ are contained, this makes it possible to provide a stable crystal structure during charge and discharge. As a result, this makes it possible to prevent the lithium-ion rechargeable battery 1 as the non-aqueous electrolyte rechargeable battery according to the fourth exemplary embodiment from causing deterioration of battery capacity.

Because the $M^1$ is a trivalent element, the addition of the $M^1$ makes it possible to prevent Li from exchanging a Ni layer, where $M^1$ is greatly different in valence number from Li.

The presence of the $M^2$ strongly fixes oxygen, and as a result, it is possible to suppress oxygen deficiency when abnormal heat generation occurs, and this structure makes it possible to increase safety of the lithium-ion rechargeable battery 1 as the non-aqueous electrolyte rechargeable battery according to the fourth exemplary embodiment.

Still further, when the amount of the $M^2$ becomes not less than 0.33, all of the oxygen atoms in the Ni layer are arranged adjacent to the $M^2$, and the oxygen atoms and the $M^2$ are combined with each other. This structure makes it possible to provide superior oxygen deficiency suppression effect.

It is preferable for both the $M^1$ and the $M^2$ to have a 6-coordination. This structure makes it possible to decrease a structural gap between the $M^1$ and $M^2$ which adjacent to transition metal elements (Coordination structure of Ni and Mn), and to improve durability of the lithium-ion rechargeable battery 1 as the non-aqueous electrolyte rechargeable battery according to the fourth exemplary embodiment.

It is preferable to contain Mn as transition metal (within a ratio of not less than 0 and not more than 1.00) in a composition of the lithium transition metal oxide. Similar to Ni, Mn forms a local structure in which 6-oxygen (O) atoms are coordinated (6-coordinated local structure). This structure makes it possible to stabilize Ni layer.

In general, overcharge of a lithium-ion rechargeable battery can cause sudden smoke and/or fire. This phenomenon is due to oxygen emitted from the positive electrode active material (positive electrode material) in the lithium-ion rechargeable battery. Specifically, electrons are supplied from oxygens contained in the positive electrode active material due to charge, and oxygen is released.

Because the $M^2$ has been added into the lithium-ion transition metal oxide, the added $M^2$ and oxygen are strongly combined with each other, rather than Ni and Mn (transition metal). That is, the addition of the $M^2$ can suppress oxygen deficiency during charge and discharge.

The lithium-ion transition metal oxide has a layer structure with a Li layer and a Ni layer. This structure provides the positive electrode having a superior Li ion conductivity. This Li layer indicates a layer made of Li as a principal component. That is, the Li layer is substantially made of Li. The Ni layer indicates a layer made of Ni (Ni compound) as a principal component. That is, the Ni layer is substantially made of the M1 and the $M^2$ as principal components.

In the lithium-ion rechargeable battery 1 as the non-aqueous electrolyte rechargeable battery according to the fourth exemplary embodiment, it is preferable for the lithium-ion transition metal oxide to have a structure expressed by the formula of $Li_2N_\alpha M^1_\beta M^2_\gamma Mn_\eta O_{4-\varepsilon}$, where $0.50<\alpha<=1.33$, $0.33<=\gamma<=1.1$, $0<=\eta<=1.00$, $0<=\beta<=0.67$, $0<=\varepsilon<=1.00$, $M^1$ is at least one of Co and Ga, and $M^2$ is at least one of Ge, Sn and Sb.

It is also preferable for the positive electrode active material to be the lithium-ion transition metal oxide. However, it is sufficient for the positive electrode active material to be a mixture which contains a known positive electrode active material(s) other than the oxide previously described.

The known positive electrode active material to be mixed is a compound capable of intercalating and deintercalating lithium ions (electrolyte ion of a non-aqueous electrolyte rechargeable battery, alkali metal ion). For example, it is possible to use various types of oxide, sulfide, lithium oxide, conductive polymer, etc. It is preferable to use a lithium-transition metal composite oxide as the positive electrode active material.

It is more preferable to use a composite oxide having a layer structure, composite oxide having a spinel structure, and/or composite oxide having a polyanion structure as the lithium-transition metal composite oxide as the positive electrode active material.

When the positive electrode active material is a mixture, the concept of the present invention does not limit a mixing ratio of the mixture. However, it is preferable for the positive electrode active material to be a main component of the lithium-ion transition metal oxide, (for example, the number of Li atoms is not less than 50%) when the total number of Li atoms in the positive electrode active material is 100%.

Further, it is also preferable for the mass of lithium-ion transition metal oxide to be a mass of not less than 50 mass % when the total mass of the positive electrode active material is 100 mass %.

The concept of the present invention is not limited by a manufacturing process of producing the positive electrode active material used in the lithium-ion rechargeable battery 1 as the non-aqueous electrolyte rechargeable battery according to the fourth exemplary embodiment. It is possible to produce the positive electrode active material by a known manufacturing method. It is acceptable for the positive electrode active material to have secondary particles consisting of aggregations of primary particles. The primary particle is not limited in its shape. For example, it is acceptable for the primary particles to have a scale shape, a ball shape, a potato-like shape, etc.

It is preferable for the primary particle forming the positive electrode active material to have a crystallite diameter of not more than 100 nm, and to have a minor axis of not more than 1 µm. It is more preferable for the primary particle forming the positive electrode active material to have a minor axis of not more than 500 nm.

It is preferable for the primary particle forming the positive electrode active material to have approximately a ball shape having a particle size (for example, an average particle size D50) of not more than 1 µm, and more preferable to have such a ball shape having a particle size of not more than 0.5 µm (500 nm).

[Conductive Material, Binder, Mixture, Positive Electrode Current Collector]

The conductive material has electric conductivity of the positive electrode 11. It is possible to use carbon black (CB), amorphous carbon fine particles such as needle coke, etc. There are acetylene black (AB), ketien black (KB), carbon nano-fiber (CN), etc. as the carbon black (CB) fine graphite particles.

The binder of the positive electrode mixture bonds the positive electrode active material particles with conductive material. There are known as binder, polyVinylidene diFluoride (PVDF), ethylene propylene diene Monomer (EPDM), styrene-butadiene rubber (SBR), acrylonitrile butadiene rubber (NBR), fluorine-containing rubber, etc. However, the concept of the present invention is not limited by this, and it is acceptable to use another type of binder.

Organic solvent is used as the positive electrode mixture in order to dissolve the binder. For example, there are, as organic solvent, N-methyl-2-pyrrolidone (NMP), dimethyl formamide, dimethyl acetamide, methyl ethyl ketone, cyclohexznone, methyl acetate, methyl acrylate, diethylene triamine, N—N-dimethyl amino propylamine, ethylene oxide, tetrahydrofuran, etc.

The concept of the present invention is not limited by the solvent previously described. It is also acceptable to use a mixture slurry of positive electrode active material with polytetrafluoroethylene (PTFE) by adding water, dispersing agent, thickener, etc.

It is possible to use an available current collector as the positive electrode current collector 110. For example, it is acceptable to use a foil plate, a net plate, a punched metal plate, and a formed metal plate made of aluminum which has been processed. However, the concept of the present invention is not limited by these materials and products.

The thickness of the positive electrode current collector 110 is not especially limited. It is possible for the positive electrode current collector 110 to have the same thickness as a conventional positive electrode current collector. For example, it is preferable for the positive electrode current collector 110 to have a thickness of not more than 20 µm. It is more preferable for the positive electrode current collector 110 to have a foil plate having a thickness of approximately 15 µm.

[Properties of Positive Electrode]

When the SOC (state of charge) of the positive electrode 11 is zero %, the positive electrode 11 has a resistance which is not less than twice of a SOC which is not less than a predetermined SOC. The resistance of the positive electrode 11 is a resistance of a single pole (hereinafter, a single pole resistance). It is possible to calculate the single pole resistance of the positive electrode 11 on a basis of a current (charge and discharge rate) and a voltage when an experimental battery cell (of a half cell) in which an opposite electrode is made of Li metal, which will be explained later. The resistance of the positive electrode 11 indicates the resistance when the SOC is approximately zero %, which is within a range of several % around zero %. In particular, the range of the SOC includes a region capable of correctly measuring a current and voltage of the experimental battery cell during charge and discharge. For example, it is difficult to measure a discharge resistance of the test cell when the SOC is zero %. In this case, it is possible to calculate a discharge resistance of the experimental battery cell when the discharge is performed from several % SOC to zero % SOC.

In the lithium-ion rechargeable battery 1 as the non-aqueous electrolyte rechargeable battery according to the fourth exemplary embodiment, the positive electrode 11 has a resistance when the SOC is zero % which is not less than twice of the resistance when the SOC is not less than the predetermined SOC. The positive electrode having such resistance performance has a high resistance value when the SOC is low around zero %.

The present invention does not limit a value of predetermined SOC. It is preferable for the predetermined SOC to have a value as low as possible.

The SOC region of the positive electrode 11 having a high resistance increases and the charge and discharge region in the lithium-ion rechargeable battery 1 is decreased due to the increasing of the value of the predetermined SOC. It is accordingly preferable for the predetermined SOC to have a value of not more than 10%.

It is acceptable to measure resistance performance (a relationship between resistance and SOC) of the positive electrode 11 in advance, and calculate a SOC value when a resistance value thereof becomes half of the resistance value (or a predetermined resistance value which is not more than a half resistance value) when the SOC is zero %. After this, it is possible to use the obtained SOC value.

[Negative Electrode]

In the lithium-ion rechargeable battery 1 as the non-aqueous electrolyte rechargeable battery according to the fourth exemplary embodiment, the negative electrode 12 contains negative electrode material. A negative electrode active material layer 121 is formed on a surface of the negative electrode current collector 120 in the negative electrode 12.

The negative electrode active material layer 121 is formed by mixing negative electrode active material and binder together to produce negative electrode material, and applying the produced negative electrode material on a surface of the negative electrode current collector 120, and then drying it. The negative electrode material is formed as a paste (or a slurry) by using an appropriate solvent. It is acceptable to add a known additive into the negative electrode material and the negative electrode 12.

[Negative Electrode Active Material]

It is possible to use a conventional negative electrode active material to produce the negative electrode 12 in the lithium-ion rechargeable battery 1 as the non-aqueous electrolyte rechargeable battery according to the fourth exemplary embodiment. For example, it is possible to use a negative electrode active material of the negative electrode 12 containing at least one of C, Si, Ti, Sn, Sb and Ge.

It is preferable for the negative electrode active material containing C to be a carbon material capable of intercalating and deintercalating electrolyte ions of the lithium-ion rechargeable battery 1, i.e. to have Li ion intercalation capability. It is more preferable for the negative electrode active material to contain carbon material which contains hardly graphitizable carbon (which is also referred as "hard carbon") or easily graphitizable carbon (which is also referred as "soft carbon").

When carbon material is used as the negative electrode active material, which contains hardly graphitizable carbon or easily graphitizable carbon, it is preferable for the hardly graphitizable carbon or easily graphitizable carbon of not less than 5 mass % when the overall mass of the carbon material is 100 mass %.

When the carbon material containing hardly graphitizable carbon and easily graphitizable carbon previously described is used as the negative electrode active material, it is possible to use known carbon material other than such graphitizable carbon, i.e. hardly graphitizable carbon and easily graphitizable carbon. For example, it is possible to use graphite.

The presence of the negative electrode active material containing Si allows the lithium-ion rechargeable battery to have a high capacity, i.e. increase its capacity. It is preferable to use material containing Si or Si oxide as the negative electrode active material containing Si. It is also acceptable, as the negative electrode active material containing Si, an alloy of Si and another metal such as Ti—Si alloy.

It is preferable for the negative electrode active material containing Si to further contain carbon material. It is preferable to use graphite as the carbon material contained in the negative electrode active material which contains Si. The fourth exemplary embodiment does not limit a content ratio of the carbon material in the negative electrode active material when the negative electrode active material containing Si further contains carbon material.

The negative electrode active material containing Ti increases durability of the lithium-ion rechargeable battery 1. It is preferable to use, as the negative electrode active material containing Ti, a compound capable of intercalating and deintercalating electrolyte ions of the lithium-ion rechargeable battery (Li ion intercalation capability). There are, as the negative electrode active material containing Ti, metal oxide containing titanium (Ti) such as lithium-titanium composite oxide, titanium oxide, niobium-titanium complex oxide, etc. It is more preferable to use lithium-titanium composite oxide as the negative electrode active material containing Ti.

It is preferable to use $TiO_2(B)$ as the lithium-titanium composite oxide. It is preferable for the negative electrode active material to contain $TiO_2(B)$ of not less than 5 mass % when the overall mass of the lithium-titanium composite oxide is 100 mass %.

It is acceptable for the negative electrode active material to contain a compound which contain Sn, Sb and Ge. Those compounds are alloy material having a large volume change. It is also acceptable to use an alloy of the negative electrode active material and another metal such as Ti—Si, Ag—Sn, Sn—Sb, Ag—Ge, Cu—Sn, Ni—Sn, etc.

[Conductive Material, Binder, Mixture, Negative Electrode Current Collector]

It is possible to use carbon material, metal powder, and conductive polymer as the conductive material of the negative electrode 12 in the lithium-ion rechargeable battery 1 according to the fourth exemplary embodiment. In view of conductivity and stability, it is preferable to use carbon material such as AB, KB, CB, etc.

It is possible to use, as the binder of the negative electrode 12, PTFE, PVDF, fluorine resin copolymer (4 fluorinated ethylene-hexafluoride propylene copolymer), SBR, acrylic rubber, fluorine-based rubber, polyvinyl alcohol (PVA), styrene-maleic acid resin, polyacrylate, carboxyl methyl cellulose (CMC), etc.

It is also possible to use, as a solvent of negative electrode material of the negative electrode 12, organic solvent such as MNP, water or aqueous solvent.

It is possible to use a conventional current collector as the negative electrode current collector 120, for example, to use material obtained by processing metal such as Cu, stainless, titanium and nickel. For example, it is possible to use, as the negative electrode current collector 120, a foil plate, a net plate, a punched metal plate, a formed metal plate. However, the concept of the present invention is not limited by these materials and products.

[Non-Aqueous Electrolyte Body]

It is also acceptable to use conventional aqueous electrolyte as the non-aqueous electrolyte 13. That is, it is possible to use, as the non-aqueous electrolyte 13, material in which a supporting electrolyte is dissolved in non-aqueous solvent. In addition, it is acceptable to use the non-aqueous electrolyte 13 with a conventional additive.

The supporting electrolyte is not limited by the material containing lithium. For example, it is preferable to use, as the supporting electrolyte, at least one of inorganic salts of $LiPF_6$, $LiBF_4$, $LiClO_4$, and $LiAsF_6$, a derivative of these inorganic salts, and organic salt selected from $LiSO_3CF_3$, $LiC(SO_3CF_3)_3$, $LiN(SO_2CF_3)$, $LiN(SO_2C_2F_5)_2$, $LiN(SO_2CF_3)(SO_2C_4F_9)$, and a derivative of these organic salts. The presence of these supporting electrolytes provides a superior battery performance and performance. Further, this makes it possible to enhance its battery performance at a temperature which is different to the room temperature. The present invention does not limit a concentration of the supporting electrolyte. It is preferable to select a concentration of the supporting electrolyte on the basis of the type of the supporting electrolyte and the kind of organic solvent.

The non-aqueous solvent dissolves the supporting electrolyte. It is acceptable for the non-aqueous solvent to have another capability other than the capability of dissolving the non-aqueous solvent. For example, it is preferable to use, as the non-aqueous solvent, carbonates, halogenated hydrocarbons, ethers, ketones, nitriles, lactones, oxolane compounds, etc. In particular, it is preferable to use propylene carbonate, ethylene carbonate (EC), 1,2-Dimethoxyethane, dimethyl carbonate (DMC), diethyl carbonate (DEC), ethyl methyl carbonate (EMC), vinylene carbonate (VC), etc., and a mixed solvent thereof. It is preferable to use a non-aqueous solvent of not less than one of carbonates and ethers in those organic solvents in order to provide superior solubility, dielectric constant, viscosity of the supporting electrolyte, and to increase charge and discharge efficiency of the lithium ion rechargeable battery 1.

There is a conventional additive which is decomposed to form a film (for example, solid electrolyte interphase, SEI film) on a surface of an electrode (i.e. on a surface of the positive electrode, in particular, the positive electrode active material). This film formed on the surface of the electrode (positive electrode) has stable performance. When the positive electrode becomes at a high potential (i.e. the charge operation progresses at a high potential of the positive electrode), the film formed on the surface of the electrode (positive electrode) is not decomposed and continues to have stable performance. This structure makes it possible to suppress capacity of the electrode (positive electrode) from deteriorating by the formation of this film.

[Separator]

In the lithium-ion rechargeable battery 1 according to the fourth exemplary embodiment, the separator 14 insulates the positive electrode 11 from the negative electrode 12, and supports the non-aqueous electrolyte 13. For example, it is preferable to use a porous synthetic resin film as the separator 14, in particular, to use polyolefin-based polymer (polyethylene, polypropylene).

[Battery Casing]

In the lithium-ion rechargeable battery 1 according to the fourth exemplary embodiment, the battery casing 15 accommodates the positive electrode 11, the negative electrode 12, the separator 14 and the non-aqueous electrolyte 13. That is, the positive electrode 11, the negative electrode 12, the separator 14 and the non-aqueous electrolyte 13 are stored in an inside of the battery casing 15, and completely sealed. The battery casing 15 is made of material capable of preventing water from penetrating into the inside of the battery casing 15 from the outside. For example, it is possible to use metal and a laminated film having a metal layer as the battery casing 15.

[Another Structure of Lithium-Ion Rechargeable Battery]

In the lithium-ion rechargeable battery 1 according to the fourth exemplary embodiment, the ratio of the first capacity of the negative electrode 12 and the second capacity of the negative electrode 12 is not less than 0.05, where the first capacity of the negative electrode 12 is within a range of more than (the average OCP−0.10 [V]) and less than (the average OCP+0.25 [V]), when the average OCP is the potential of the negative electrode 12 when the lithium-ion rechargeable battery 1 has the SOC of 50%, and the second capacity of the negative electrode 12 is within a range when the OCP of the negative electrode 12 is more than (the average OCP+0.25 [V]). The OCP indicates an open circuit potential.

That is, the capacity ratio of the negative electrode 12, which is calculated by (Capacity of the negative electrode 12 near Average OCP)/(Average OCP+0.25 [V]) is not less than 0.05. When the capacity ratio of the negative electrode 12 becomes not less than 0.05 (as the specific capacity ratio of the negative electrode 12), the lithium-ion rechargeable battery 1 according to the fourth exemplary embodiment does not use the SOC region (i.e. low SOC region) when the positive electrode 11 has a high resistance. This structure makes it possible to provide superior battery performance within a wide SOC region including the low SOC region.

If the capacity ratio of the negative electrode 12 becomes less than 0.05, charge and discharge of the lithium-ion rechargeable battery 1 uses the high resistance region of the positive electrode 11.

It is possible to calculate a potential of the negative electrode 12 on a basis of a current (charge and discharge rate) and a voltage when charge and discharge is performed by using a test cell (half-cell) having a structure in which an opposite electrode to the negative electrode 12 is made of lithium. The resistance of the negative electrode 12 indicates the resistance when the SOC is approximately zero %, which is within a range of several % around zero %.

Specifically, the range of the SOC includes a region capable of correctly measuring a current and voltage of the experimental battery cell during charge and discharge. In general, it is difficult to measure a discharge resistance the test cell at the SOC of zero %. In this case, it is possible to measure a discharge resistance by performing the discharge of the test cell from several % SOC to zero % SOC, and use the measured resistance as the discharge resistance of the test cell at the SOC of zero %.

The present invention does not limit an upper limit value of the capacity ratio (capacity of the negative electrode 12/the capacity of the positive electrode 11). However, when the capacity ratio (capacity of the negative electrode 12/the capacity of the positive electrode 11) has a high value, a usable SOC region for the charge and discharge of the lithium-ion rechargeable battery 1 decrease. That is, the battery capacity of the positive electrode 11 decreases. It is therefore preferable for the capacity ratio (capacity of the negative electrode 12/the capacity of the positive electrode 11) to be not more than 2.0, more preferable, to be not more than 1.8.

It is possible to adjust the capacity ratio (capacity of the negative electrode 12/the capacity of the positive electrode 11) on the basis of: a weight of material (or application mass) applied on the surface of the positive electrode 11 to form the positive electrode active layer 111 on the positive electrode 11;

a weight of material (or application mass) applied on the surface of the negative electrode 12 to form the negative electrode active layer 121 on the negative electrode 12; and a content (or content density) of each of the positive electrode active material and the negative electrode active material.

A description will now be given of the effects of the lithium-ion rechargeable battery 1 according to the fourth exemplary embodiment.

First Effect

As previously described, the lithium-ion rechargeable battery 1 according to the fourth exemplary embodiment uses a lithium transition metal oxide as the positive electrode active material. Further, the negative electrode 12 has the specific capacity ratio, i.e. which is not less than 0.05. The specific capacity ratio of the negative electrode 12 has been previously described. This structure makes it possible to provide the improved effect to maintain the electrical performance of the lithium-ion rechargeable battery 1 from deteriorating in the low SOC region.

Figure 8:
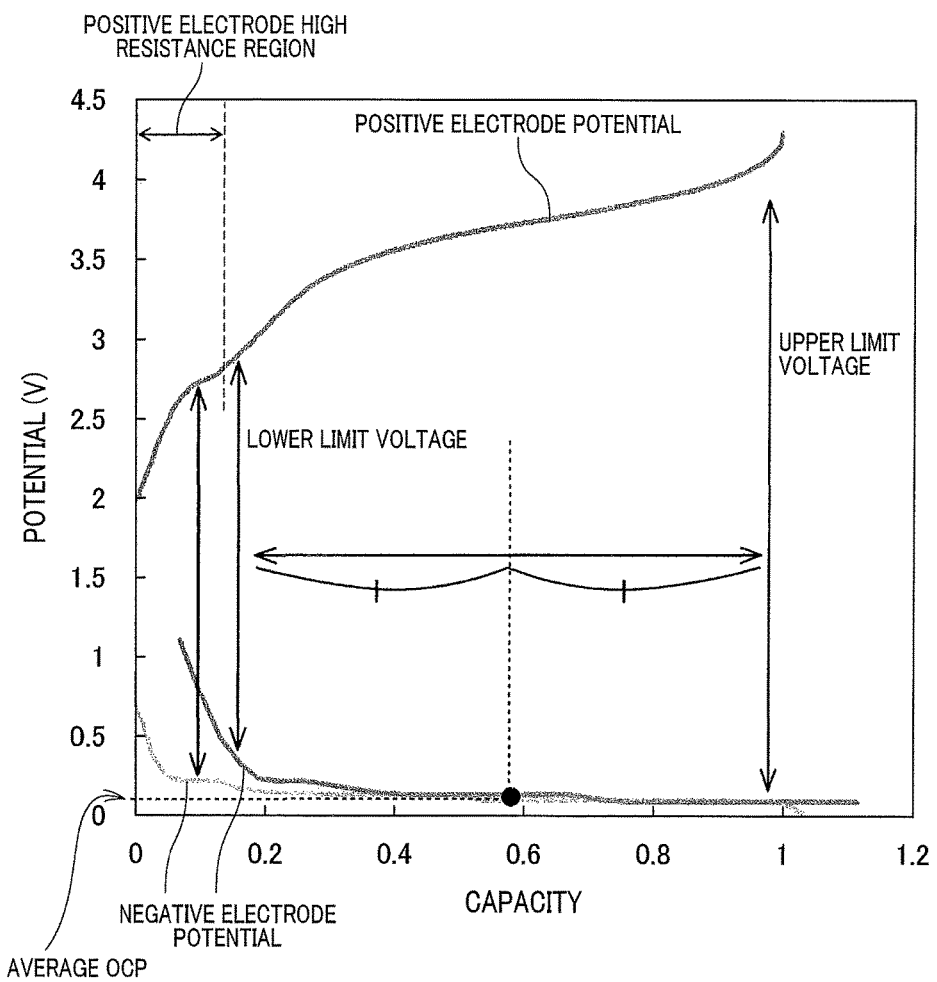
FIG. 8 is a graph showing a relationship in capacity and potential between a positive electrode and a negative electrode of the non-aqueous electrolyte rechargeable battery according to the fourth exemplary embodiment of the present invention.
Figure 9:
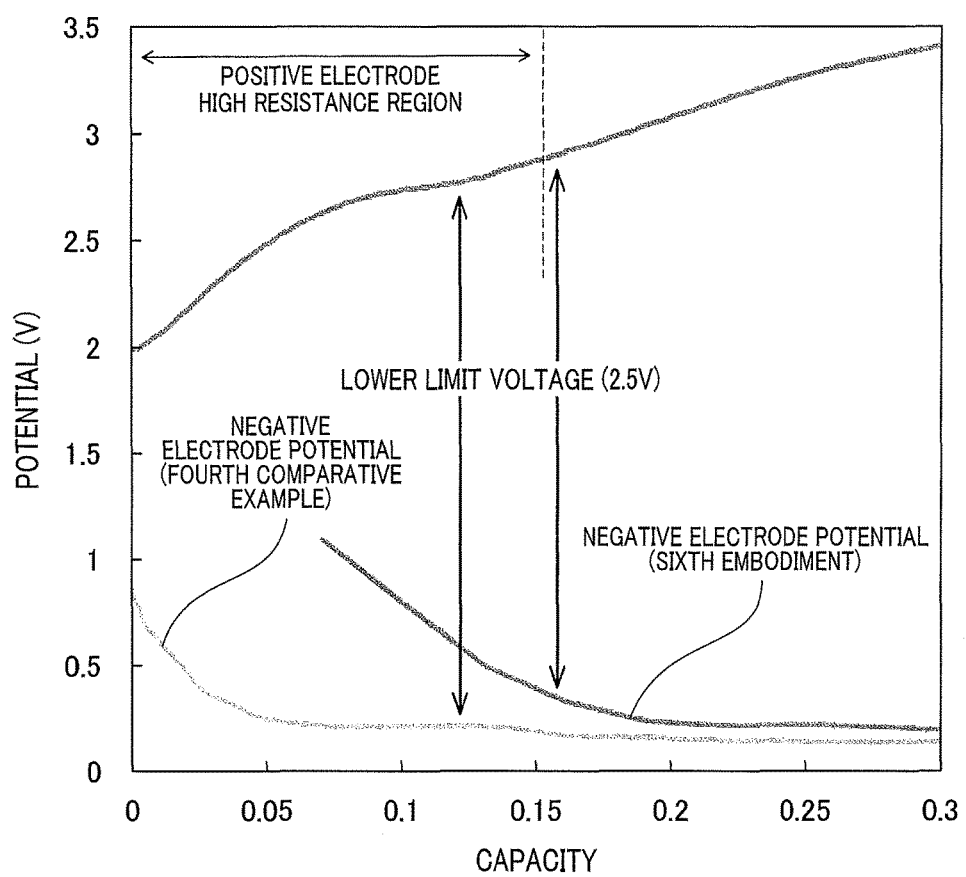
FIG. 9 is a graph showing another relationship in capacity and potential between the positive electrode and the negative electrode of the non-aqueous electrolyte rechargeable battery according to the sixth exemplary embodiment of the present invention.

FIG. 8 is a graph showing a relationship in capacity and potential between the positive electrode 11 and the negative electrode 12 of the non-aqueous electrolyte rechargeable battery according to the fourth exemplary embodiment. FIG. 9 is a graph showing another relationship between capacity and potential between the positive electrode 11 and the negative electrode 12 of the non-aqueous electrolyte rechargeable battery 1 according to the sixth exemplary embodiment.

FIG. 8 and FIG. 9 show the potential change on the basis of the SOC of the positive electrode 11. FIG. 9 shows the enlarged graph around the low SOC region.

The lithium-ion rechargeable battery 1 according to the fourth exemplary embodiment uses lithium transition metal oxide as the positive electrode active material of the positive electrode 11. As previously described, this lithium transition metal oxide has a high resistance in the low SOC region. In more detail, the resistance value of the positive electrode 11 when the SOC is zero % is not less than twice of the resistance thereof when the SOC is not less than the predetermined SOC. FIG. 9 shows that the predetermined SOC is 15%.

On the other hand, a potential curve of the negative electrode 12 decreases when the SOC increases from zero %. When the potential of the negative electrode 12 is sufficiently low (in a small potential change area), the potential of the negative electrode 12 does not change or slowly decreases. The voltage of the lithium-ion rechargeable battery 1 corresponds to a difference in potential (potential difference) between the two potential curves when those potential curves of both the positive electrode 11 and the negative electrode 12 are simultaneously shown in the same graph See FIG. 9).

In the lithium-ion rechargeable battery 1 according to the fourth exemplary embodiment, the negative electrode 12 has the specific capacity ratio, i.e. the ratio of the first capacity and the second capacity of the negative electrode 12, where the first capacity of the negative electrode 12 is within a range of more than (the average OCP−0.10 [V]) and less than (the average OCP+0.25 [V]), when the average OCP is the potential of the negative electrode 12 when the lithium-ion rechargeable battery 1 has the 50% SOC, and the second capacity of the negative electrode 12 is within a range when the OCP of the negative electrode 12 is more than (the average OCP+0.25 [V]).

The battery capacity of the lithium-ion rechargeable battery 1 corresponds to a capacity within the range of the lower limit voltage and the upper limit voltage shown in FIG. 8. The average OCP correspond to a half value of the capacity between the lower limit voltage and the upper limit voltage.

That is, the average OCP corresponds to the potential of the negative electrode 12 at the half value of the capacity between the lower limit voltage and the upper limit voltage.

In FIG. 8 and FIG. 9, the range when the OCP of the negative electrode 12 is more than (the average OCP+0.25 [V]) corresponds to the low SOC region because the x axis in the graphs shown in FIG. 8 and FIG. 9 indicates the capacity of the positive electrode 12.

In particular, in the lithium-ion rechargeable battery 1 according to the fourth exemplary embodiment, the ratio of the first capacity of the negative electrode 12 and the second capacity of the negative electrode 12 is not less than 0.05 (as the specific capacity ratio). This range of the specific capacity ratio of the negative electrode 12 makes it possible to avoid the battery voltage (the lower limit voltage) of the lithium-ion rechargeable battery 1 from entering the low SOC region.

When the ratio of the first capacity of the negative electrode 12 and the second capacity of the negative electrode 12 is not less than 0.05, the slope of the potential curve of the negative electrode 12 gradually changes at the high OCP capacity. This causes a slow change of the potential difference between the negative electrode 12 and the positive electrode 11 (or an increase of the potential difference). This means that the SOC value at the lower limit voltage as the potential difference between the negative electrode 12 and the positive electrode 11 increases (i.e. which is shifted rightward in FIG. 8 and FIG. 9).

When the ratio of the first capacity of the negative electrode 12 and the second capacity of the negative electrode 12 becomes not less than 0.05, the SOC value as the lower limit voltage (as the SOC value of the positive electrode 11) becomes larger than within the low SOC region of the positive electrode 11. As a result, it is possible to perform charge and discharge of the lithium-ion rechargeable battery 1 in a low resistance state. That is, this makes it possible to suppress the battery performance of the lithium-ion rechargeable battery 1 from deteriorating.

Second Effect

In the lithium-ion rechargeable battery 1 according to the fourth exemplary embodiment, the negative electrode 12 contains carbon material which contains hardly graphitizable carbon or easily graphitizable carbon. The hardly graphitizable carbon has a content of not less than 5 mass % when the overall mass of the carbon material is 100 mass %.

Use of the carbon material containing hardly graphitizable carbon or easily graphitizable carbon makes it possible for the negative electrode 12 to reliably have the specific capacity ratio of the negative electrode 12. The specific capacity ratio of the negative electrode 12 has been previously explained.

If the carbon material contains less than 5 mass % hardly graphitizable carbon or easily graphitizable carbon, it is difficult for the negative electrode 12 to have the specific capacity ratio.

Carbon material without hardly graphitizable carbon or easily graphitizable carbon easily decreases the capacity ratio of the negative electrode 12 to be less than 5 mass %. In particular, increasing of the content of graphite in the carbon material easily decreases the capacity ratio of the negative electrode 12.

Third and Fourth Effects

In the lithium-ion rechargeable battery 1 according to the fourth exemplary embodiment, the negative electrode 12 contains Si or silicon oxide as the negative electrode active material. This structure of the negative electrode 12 makes it possible to reliably have the specific capacity ratio.

It is preferable for the negative electrode active material to further contain carbon material.

Containing of the carbon material suppresses the capacity ratio of the negative electrode 12 from greatly increasing. The carbon material is also used as conductive material and suppresses the resistance of the negative electrode 12 from increasing.

Fifth and Sixth Effects

In the lithium-ion rechargeable battery 1 according to the fourth exemplary embodiment, the negative electrode 12 contains lithium-titanium composite oxide as the negative electrode active material. This structure makes it possible for the negative electrode 12 to reliably have the specific capacity ratio previously described. Further, the lithium-titanium composite oxide contains $TiO_2(B)$ of not less than 5 mass % when the overall mass of the lithium-titanium composite oxide is 100%.

Containing of $TiO_2$ (B) suppresses the capacity ratio of the negative electrode 12 from greatly increasing. When the content of $TiO_2$ (B) is less than 5 mass %, it is difficult to sufficiently have the effect obtained by the addition of $TiO_2$ (B).

Lithium-titanium composite oxide without containing $TiO_2$ (B) easily decreases the capacity ratio of the negative electrode 12 to be less than 0.05.

Seventh Effect

In the lithium-ion rechargeable battery 1 according to the fourth exemplary embodiment, the predetermined SOC is a value of not more than 10% SOC. This structure makes it possible for the lithium-ion rechargeable battery 1 to provide the improved effects previously described.

Eighth Effect

In the lithium-ion rechargeable battery 1 as the non-aqueous electrolyte rechargeable battery according to the fourth exemplary embodiment, the lithium-ion transition metal oxide has the structure expressed by the formula of $Li_2Ni_\alpha M^1_\beta M^2_\gamma Mn_\eta O_{4-\epsilon}$, where $0.50<\alpha<=1.33$, $0.33<=\gamma<=1.1$, $0<=\eta<=1.00$, $0<=\beta<=0.67$, $0<=\epsilon<=1.00$, $M^1$ is at least one of Co and Ga, and $M^2$ is at least one of Ge, Sn and Sb.

Use of the lithium-ion transition metal oxide as the positive electrode active material makes it possible for the lithium-ion rechargeable battery 1 to provide the excellent effects previously described.

Fifth Exemplary Embodiment

A description will be given of the lithium-ion rechargeable battery according to the fifth exemplary embodiment with reference to FIG. 5 and FIG. 6.

As previously described, FIG. 5 is a perspective view showing a schematic structure of the non-aqueous electrolyte rechargeable battery according to the fifth exemplary embodiment. FIG. 6 is a perspective view showing another schematic structure of the non-aqueous electrolyte rechargeable battery according to the fifth exemplary embodiment. That is, FIG. 6 shows a cross section along the line VI-VI shown in FIG. 5.

The positive electrode 11, the negative electrode 12 and the non-aqueous electrolyte 13, etc. in the lithium-ion rechargeable battery 1 according to the fifth exemplary embodiment have the same structure of those in the lithium-ion rechargeable battery 1 according to the seventh exemplary embodiment.

In the lithium-ion rechargeable battery 1 according to the fifth exemplary embodiment, the positive electrode 11 and the negative electrode 12 are accommodated and sealed in the battery casing 2. That is, the lithium-ion rechargeable battery 1 according to the fifth exemplary embodiment has the same structure as that of the fourth exemplary embodiment.

The positive electrode 11 has a structure in which the positive electrode active material layer 111 is formed on the surface of the positive electrode current collector 110 having a rectangle-like shape. The non-applied section 112 (on which no positive electrode active material layer 111 is formed) is formed on one side of the positive electrode 11 having a rectangle shape from which the positive electrode current collector 110 is exposed.

The negative electrode 12 has a structure in which the negative electrode active material layer 121 is formed on both the surfaces of the negative electrode current collector 120 having a rectangle-like shape. A non-applied section 122 (on which no negative electrode active material layer 121 is formed) is formed on one side of the negative electrode 12 having a rectangle shape from which the negative electrode current collector 120 is exposed.

In the structure of the negative electrode 12, the negative electrode active material layer 121 is larger in area than the positive electrode active material layer 111 of the positive electrode 11. When the negative electrode active material layer 121 of the negative electrode 12 and the positive electrode active material layer 111 are overlapped together, the negative electrode active material layer 121 completely covers the positive electrode active material layer 111 of the positive electrode 11 and the positive electrode active material layer 111 is not exposed from the negative electrode active material layer 121.

The positive electrode 11 and the negative electrode 12 are stacked through the separator 14. The positive electrode 11, the negative electrode 12 and the separator 14 and the non-aqueous electrolyte 13 are accommodated in the battery casing 2 and sealed with the non-aqueous electrolyte 13 in the battery casing 2. The battery casing 2 is made of a laminate film. The separator 14 is larger in area than the negative electrode active material layer 121.

The positive electrode 11 and the negative electrode 12 are stacked to make a laminate so that the center point of the positive electrode active material layer 111 coincides with the center point of the negative electrode active material layer 121. In this structure, the non-applied section 112 of the positive electrode 11 is arranged opposite in direction to the non-applied section 122 of the negative electrode 12.

[Battery Casing]

In the lithium-ion rechargeable battery 1 according to the fifth exemplary embodiment, the battery casing 2 is made of the laminated film 20. The laminated film 20 is composed of a plastic resin layer 201 and has a predetermined shape, a metal foil 202 and a plastic resin layer 203 which have been stacked to make a laminate. The battery casing 2 is produced by softening the plastic resin layers 201 and 203 in the laminated film 20 by using heat energy or solvent, and pressing the softened laminated film 20 onto another laminated film which has been softened. This process bonds the laminated film 20 and another laminated film together.

The battery casing 2 is produced by stacking the laminated films 20 having the predetermined shape to accommodate the positive electrode 11 and the negative electrode 12, and bonding the edge section of the outer periphery of the laminated films 20 to seal the positive electrode 11 and the negative electrode 12 in the battery casing 2. The fifth exemplary embodiment performs a heat sealing process at the outer periphery of the laminated films 20 to completely seal the battery casing 20.

That is, the battery casing 2 is produced by superimposing the laminated film (first laminated film) 20 and another laminated film (second laminated film 20) together. The second laminated film 20 indicates a laminated film to be heat-sealed. It is also acceptable to use a single laminated film to produce the battery casing.

The process of heat-sealing the outer periphery of the battery casing 2 is performed in a decreased-pressure atmosphere (or in vacuum) or in an inert gas atmosphere (in noble gas, preferably in Ar gas atmosphere). This process prevents material which would deteriorate the electrode performance from penetrating and entering the inside of the battery casing 2. Accordingly, the electrodes such as the positive electrode 11 and the negative electrode 12 are completely sealed in the inside of the battery casing 2 without air (and moisture included in air).

As shown in FIG. 5 and FIG. 6, the laminated film 20 which has been prepared has a plate section 21 and an embossed part 23 having a bath-shape. This plate section 21 forms a sealed section between the laminated film 20 with another laminated film 20 which have been stacked. The embossed part 23 is formed at a center section of the laminated film 20, and accommodates the positive electrode 11 and the negative electrode 12.

As shown in FIG. 5 and FIG. 6, both the laminated films 20 are formed to have the embossed part 23 to accommodate the positive electrode 11 and the negative electrode 12. When both the laminated films 20 have the same shape and are completely stacked face with each other, both the plate parts 21 are completely overlapped together without displacement.

In the laminated films 20, the plate section 21 and a bottom section 23A of the embossed part 23 (as the bath-shape) are formed parallel with each other. The bottom section 23A corresponds to the edge part in the stacked direction in the lithium-ion rechargeable battery 1 according to the fifth exemplary embodiment.

The plate section 21 is connected to the bottom section 23A of the embossed part 23 by an inclined section 23B. The inclined section 23B extends in a direction (inclined direction) which crosses a direction parallel to the plate section 21 and the bottom section 23A. The bottom section 23A is formed smaller than an opening section (which is formed at an edge section inside of the plate section 21 of the embossed part 23.

In the battery casing 2, a seal section 22 is formed at the outer periphery of both the plate sections 21. A non-sealed section is formed in the inside (to the direction close to the electrolyte) of the seal section 22. In the non-sealed section, the plate sections 21 are overlapped together. It is acceptable to be in contact with the non-sealed section in which the plate sections 21 are overlapped, or to form a gap in this non-sealed section.

Further, it is acceptable to arrange the non-sealed sections 112 and 122 of the electrode plates (the plate of the positive electrode plate 11 and the plate of the negative electrode 12) and the separator 14 in the non-sealed section. The laminated films 20 are shaped in advance to fit the shape shown in FIG. 5 and FIG. 6. It is possible to shape the laminated films 20 by using a conventional forming method. In the lithium-ion rechargeable battery 1, the positive electrode 11 and the negative electrode 12 are connected to a positive electrode terminal 25 and a negative electrode terminal 26, respectively.

[Electrode Terminal]

In the lithium-ion rechargeable battery 1 according to the fifth exemplary embodiment, the positive electrode terminal 25 is electrically connected to the non-sealed section 112 of the positive electrode 11. Similarly, the negative electrode terminal 26 is electrically connected to the non-applied section 12 of the negative electrode 12.

In the lithium-ion rechargeable battery 1 according to a first exemplary embodiment, the positive electrode terminal 25 and the negative electrode terminal 26 are connected to the non-sealed section 112 of the positive electrode 11 and the non-sealed section 122 of the negative electrode 12, respectively by welding.

The center part in a wide direction of the non-sealed section 112 of the positive electrode 11 and the non-sealed section 122 of the negative electrode 12 is connected to the positive electrode terminal 25 and the negative electrode terminal 26, respectively.

A part of each of the positive electrode terminal 25 and the negative electrode terminal 26, which penetrates the battery casing 2 and are exposed outside, is bonded through a sealant 24 so as to seal the plastic resin layer 201 of the laminated film 20 and the electrode terminals 25 and 26 are completely sealed.

Each of the positive electrode terminal 25 and the negative electrode terminal 26 is made of metal sheet. The sealant 24 covers the part at which the positive electrode terminal 25 and the negative electrode terminal 26 are overlapped with the plate section 21. Because each of the positive electrode terminal 25 and the negative electrode terminal 26 has a sheet-like shape, this structure makes it possible to decrease stress which would deform the laminated film 20 at the part in which the positive electrode terminal 25 and the negative electrode terminal 26 penetrate the battery casing 2. It is also possible to easily weld the non-applied sections 112 of the positive electrode 11 and the positive electrode terminal 25, and weld the non-applied sections 122 of the negative electrode 12 and the negative electrode terminal 26.

It is preferable for the lithium-ion rechargeable battery 1 of a laminate type according to the fifth exemplary embodiment to have a restraint member capable of suppressing the positive electrode 11 and the negative electrode 12 separating away from with each other. Use of the restraint member makes it possible to suppressing a distance between the positive electrode 11 and the negative electrode 12 in a stacked direction from prolonging.

If the distance between the positive electrode 11 and the negative electrode 12 is prolonged, a moving distance of electrolyte ions increases, and as a result, this increases an internal resistance of the lithium-ion rechargeable battery 1. Use of the restraint member can suppress the distance between the positive electrode 11 and the negative electrode 12 from prolonging.

For example, it is possible to use as the restraint member a member having a pair of jigs which are in contact with both the outer peripheral surfaces in the stacked direction of the lithium-ion rechargeable battery 1 of a laminate type. It is acceptable to use, as the restraint member, a member having a pair of jigs which is capable of pressing the outer peripheral surface of the lithium-ion rechargeable battery 1 of a laminate type, or a member having a pair of jigs which is capable of suppressing the thickness of the lithium-ion rechargeable battery 1 of a laminate type from increasing. It is also acceptable to use, as the restraint member, an outer casing having a predetermined rigidity for accommodating the lithium-ion rechargeable battery 1 of a laminate type.

[Effects]

The shape of the lithium-ion rechargeable battery 1 according to the fifth exemplary embodiment is different from that of the lithium-ion rechargeable battery 1 according to the fourth exemplary embodiment. In addition, the lithium-ion rechargeable battery 1 according to the fifth exemplary embodiment having the improved structure previously described has the same effects and behavior as the lithium-ion rechargeable battery 1 of a laminate type according to the fourth exemplary embodiment.

Sixth Exemplary Embodiment

A description will be given of the lithium-ion rechargeable battery according to the sixth exemplary embodiment with reference to FIG. 7. As previously explained, FIG. 7 is a view showing a schematic cross section of the lithium-ion rechargeable battery 1 as a non-aqueous electrolyte rechargeable battery according to the sixth exemplary embodiment. The lithium-ion rechargeable battery 1 according to the sixth exemplary embodiment is a coin shape rechargeable battery. Each of the positive electrode 11, the negative electrode 12 and the non-aqueous electrolyte 13 in the lithium-ion rechargeable battery 1 according to the third exemplary embodiment has the same structure as those of the lithium-ion rechargeable battery 1 according to the fourth exemplary embodiment.

In the structure of the lithium-ion rechargeable battery 1 according to the sixth exemplary embodiment, the battery casing 3 accommodates the positive electrode 11 and the negative electrode 12. That is, the positive electrode 11 and the negative electrode 12 are sealed in the battery casing 3. Other components of the lithium-ion rechargeable battery 1 according to the third exemplary embodiment have the same structure as those according to the fourth and fifth exemplary embodiments as explained below.

Specifically, the lithium-ion rechargeable battery 1 according to the sixth exemplary embodiment has the positive electrode 11, the negative electrode 12, the non-aqueous electrolyte 13, the separator 14, a positive electrode casing 31, a negative electrode casing 32, a sealing member 33 and a supporting member 34.

In the structure of the lithium-ion rechargeable battery 1 according to the sixth exemplary embodiment, built-in components are completely sealed by the positive electrode casing 31 and the negative electrode casing 32. In other words, the positive electrode casing 31 and the negative electrode casing 32 accommodate the built-in components. The built-in components contain the positive electrode 11, the negative electrode 12, the non-aqueous electrolyte 13, the separator 14 and the supporting member 34. For example, it is possible to use a gasket as the sealing member 33.

As shown in FIG. 7, the positive electrode 11, the separator 14, and the negative electrode 12 are arranged in the positive electrode casing 31 and the negative electrode casing 32 so that the positive electrode active material layer 111 faces the negative electrode active material layer 121 through the separator 14.

As shown in FIG. 7, the positive electrode active material layer 111 is arranged in surface contact with and electrically connected to the positive electrode current collector 110 in the positive electrode casing 31. Similarly, the negative electrode active material layer 121 is arranged in surface contact with and electrically connected to the negative electrode current collector 120 in the negative electrode casing 32.

[Effects]

The shape of the lithium-ion rechargeable battery 1 according to the sixth exemplary embodiment is different from that of the lithium-ion rechargeable battery 1 according to the fourth exemplary embodiment. The components and behavior of the lithium-ion rechargeable battery 1 according to the sixth exemplary embodiment are the same as those of the lithium-ion rechargeable battery 1 according to the fourth exemplary embodiment.

It is possible to apply the lithium-ion rechargeable battery 1 according to the fifth and sixth exemplary embodiments to laminate type batteries and coin-shaped batteries. However, the concept of the present invention is not limited by this. It is possible to apply the lithium-ion rechargeable battery 1 to various types of battery such as having a cylindrical-shaped type, a prismatic-shaped type, etc. It is also acceptable to combine assembled lithium-ion rechargeable batteries in series or in parallel with each other.

SIXTH TO ELEVENTH EXAMPLES AND FOURTH TO SEVENTH COMPARATIVE EXAMPLES

A description will now be given of a method of preparing a positive electrode active material and a negative electrode active material, and producing a positive electrode, a negative electrode and a lithium-ion rechargeable battery according to sixth to eleventh examples and fourth to seventh comparative examples.

SIXTH EXAMPLE (Positive Electrode)

A solution was prepared, which contains metal complexes of each of Li, Ni, Mn and Sn. The prepared solution of metal complexes was adjusted to have a chemical composition of target positive electrode material. That is, the prepared solution of metal complexes was adjusted so that an atomic ratio of Li:Ni:Mn:Sn becomes 2:1:0.67:0.33.

The obtained solution of metal complexes was dried in a drying oven, and heated in order to remove organic components from the obtained solution. After this process, the obtained material was calcined and sintered. These processes produced a positive electrode active material ($Li_2NiMn_{0.67}Sn_{0.33}O_4$ powder) according to the first example.

Next, 88 parts by mass of the positive electrode active material, conductive material, and 6 parts by mass of a binder were added to N-methylpyrrolidone (MNP) and mixed together to produce a paste (or a slurry) of positive electrode mixture. Acetylene black was used as the conductive material. PolyVinylidene DiFluoride (PVDF) was used as the binder. The obtained positive electrode mixture was applied on both the surfaces of a current collector made of aluminum foil having a thickness of 15 μm. The obtained current collector was dried and pressed with a predetermined pressure to produce the positive electrode 11 according to the sixth example.

The positive electrode active material used in the first example corresponds to a lithium-ion transition metal oxide ($Li_{2-x}Ni_\alpha M^1_\beta M^2_\gamma O_{4-\epsilon}$, where x=0, α=1, β=0, γ=1 (=0.67+0.33), $M^2$: Mn and Sn, and ε=0.

[Negative Electrode]

98 parts by mass of graphite powder, 1 parts by mass of styrene-butadiene rubber (SBR) as a binder, and 1 parts by mass of carboxymethyl cellulose (CMC) as another binder were added to water and mixed together to produce a paste (or a slurry) of negative electrode mixture. The CMC as the binder was solved in water and a solid content of the CMC in water becomes 1 parts by mass. The obtained negative electrode mixture was applied on both the surfaces of a current collector made of copper foil having a thickness of 10 μm. The obtained negative electrode current collector was dried and pressed with a predetermined pressure to produce the negative electrode 12 according to the sixth to eleventh examples.

The negative electrode mixture was applied on both the surfaces of the current collector made of copper foil so that an applied amount of the negative electrode mixture and the capacity per unit area becomes 1.1.

(Non-Aqueous Electrolyte)

A solution was prepared as the non-aqueous electrolyte 13, which contained a mixture solution in which 1 mol % of $LiPF_6$ was dissolved in a mixture solvent having a relationship of ethylene carbonate (EC):diethyl carbonate (DCE) of 30:70 (vol %), 2 mass % of vinylene carbonate (VC) were added to the non-aqueous electrolyte 13 when the overall of the non-aqueous electrolyte 13 was 100 mass %.

(Lithium-Ion Rechargeable Battery or Secondary Battery)

As previously described in detail, the lithium-ion rechargeable battery 1 has the structure in which the positive electrode 11, the separator 14, and the negative electrode 12 are stacked in this order. This stacked components is a stacked body. The obtained stacked body and the non-aqueous electrolyte 13 are accommodated with the non-aqueous electrolyte 13 in the battery casing 2 of a laminate type, specifically, after injecting the non-aqueous electrolyte 13 into the battery casing 2 in which the stacked body is stored. After this process, the battery casing 2 was completely sealed by using heat sealing. The number of the stacked bodies accommodated in the battery casing 2 is adjusted to have a battery capacity of 3 [Ah], where each of the stacked bodies consists of the positive electrode 11, the separator 14 and the negative electrode 12.

A porous film made of polyethylene having a thickness of 25 μm was used as the separator 14.

The battery casing 2 is made of laminate film 20 consisting of a polypropylene layer 201, an aluminum foil 202, and a polyethylene terephthalate layer 203.

After assembly previously described, CC charge (Constant Current charge) of the lithium-ion rechargeable battery 1 was performed until the room temperature to 4.1 [V] cut-off voltage, and CC discharge (Constant Current discharge) thereof was performed at room temperature until the 2.5 [V] cut-off voltage. That is, the activation of the lithium-ion rechargeable battery 1 was performed by charge and discharge at 1/3 C×5 cycles.

SEVENTH EXAMPLE

The negative electrode mixture as the seventh example was made by adding 98 parts by mass of easily graphitizable carbon, 1 parts by mass of SBR, 1 parts by mass of CMC into water, and mixing them together. Other components of the negative electrode material were the same as those of the negative electrode mixture used in the lithium-ion rechargeable battery 1 according to the sixth example.

EIGHTH EXAMPLE

The negative electrode mixture as the eighth example was made by adding 90 parts by mass of graphite powder, 8 parts by mass of easily graphitizable carbon, 1 parts by mass of SBR, 1 parts by mass of CMC into water, and mixing them together. Other components of the negative electrode material were the same as those of the negative electrode mixture used in the lithium-ion rechargeable battery 1 according to the sixth example.

NINTH EXAMPLE

The negative electrode mixture as the ninth example was made by adding 90 parts by mass of graphite powder, 8 parts by mass of silicon oxide ($SiO_2$) powder, 1 parts by mass of SBR, 1 parts by mass of CMC into water, and mixing them together. Other components of the negative electrode material were the same as those of the negative electrode mixture used in the lithium-ion rechargeable battery 1 according to the sixth example.

FOURTH COMPARATIVE EXAMPLE

The negative electrode mixture as the fourth comparative example was made by adding 98 parts by mass of graphite powder, 1 parts by mass of SBR, 1 parts by mass of CMC into water, and mixing them together. Other components of the negative electrode material were the same as those of the negative electrode mixture used in the lithium-ion rechargeable battery 1 according to the sixth example.

TENTH EXAMPLE

The negative electrode mixture as the tenth example was made by adding 45 parts by mass of lithium titanate powder expressed by $Li_4Ti_5O_{12}$, 45 parts by mass of $TiO_2(B)$ powder, 5 parts by mass of acetylene black as conductive material, 5 parts by mass of PVDF as binder, into NMP, and mixing them together. The obtained negative electrode mixture was applied on both the surfaces of the current collector made of aluminum foil having a thickness of 15 μm. After this process, the negative electrode mixture was dried and pressed with a predetermined pressure.

After assembly previously described, CC charge (Constant Current charge) of the lithium-ion rechargeable battery 1 was performed at room temperature until the 2.8 [V] cut-off voltage, and CC discharge (Constant Current discharge) thereof was performed at room temperature until the 2.0 [V] cut-off voltage. That is, the activation of the lithium-ion rechargeable battery 1 was performed by charge and discharge at 1/3 C×5 cycles.

Other components of the test samples were the same as those of the negative electrode mixture used in the lithium-ion rechargeable battery 1 according to the sixth example.

FIFTH COMPARATIVE EXAMPLE

The negative electrode mixture as the fifth comparative example was made by adding 90 parts by mass of lithium titanate powder expressed by $Li_4Ti_5O_{12}$, 5 parts by mass of acetylene black as conductive material, 5 parts by mass of PVDF as binder, into NMP, and mixing them together. Other components of the negative electrode material were the same as those of the negative electrode mixture used in the lithium-ion rechargeable battery 1 according to the tenth example.

ELEVENTH EXAMPLE

The eleventh example used, as the positive electrode active material, a powder having a chemical composition expressed by the formula of $Li_2Ni_{0.67}Co_{0.67}Mn_{0.33}Sn_{0.33}O_4$. Other components of the lithium-ion rechargeable battery 1 according to the eleventh example were the same as those of the lithium-ion rechargeable battery 1 according to the sixth example.

In the production of the positive electrode active material used in the lithium-ion rechargeable battery 1 according to the eleventh example, a solution was prepared, which contained metal complexes of each of Li, Ni, Mn, Co and Sn. The prepared solution of metal complexes was adjusted to have a chemical composition of target positive electrode material. That is, the prepared solution of metal complexes was adjusted so that an atomic ratio of Li:Ni:Co:Mn:Sn becomes 2:0.67:0.67:0.33:0.33. Similar to the sixth example, the obtained solution of metal complexes was dried in a drying oven, and heated in order to remove organic components from the obtained solution. After this, the obtained material was calcined and sintered to produce the positive electrode active material according to the eleventh example.

The positive electrode active material used in the eleventh example corresponds to a lithium-ion transition metal oxide ($Li_{2-x}Ni_\alpha M^1_\beta M^2_\gamma O_{4-\epsilon}$, where x=0, α=0.67, $M^1$:Co, β=0.67, $M^2$: Mn and Sn, γ=0.66 (=0.33+0.33), and ε=0.

SIXTH COMPARATIVE EXAMPLE

The sixth comparative example used, as the positive electrode active material, a powder having a chemical composition expressed by the formula of $Li_2Ni_{0.67}Co_{0.67}Mn_{0.33}Sn_{0.33}O_4$. Other components of the lithium-ion rechargeable battery 1 according to the sixth comparative example were the same as those of the lithium-ion rechargeable battery 1 according to the eleventh example.

TWELFTH EXAMPLE

The twelfth example used, as the positive electrode active material, a powder having a chemical composition expressed by the formula of $Li_2NiMn_{0.67}Ge_{0.33}O_4$. Other components of the lithium-ion rechargeable battery 1 according to the eleventh example were the same as those of the lithium-ion rechargeable battery 1 according to the sixth example.

In the production of the positive electrode active material used in the lithium-ion rechargeable battery 1 according to the twelfth example, a solution was prepared, which contained metal complexes of each of Li, Ni, Mn, and Ge. The prepared solution of metal complexes was adjusted to have a chemical composition of target positive electrode material. That is, the prepared solution of metal complexes was adjusted so that an atomic ratio of Li:Ni:Mn:Ge becomes 2:1:0.67:0.33. Similar to the sixth example, the obtained solution of metal complexes was dried in a drying oven, and heated in order to remove organic components from the obtained solution. After this, the obtained material was calcined and sintered. These processes produced the positive electrode active material according to the twelfth example.

The positive electrode active material used in the twelfth example corresponds to a lithium-ion transition metal oxide ($Li_{2-x}Ni_\alpha M^1_\beta M^2_\gamma O_{4-\epsilon}$, where x=0, α=1, β=0, γ=1.00 (=0.67+0.33), $M^2$: Mn and Ge, and ε=0.

SEVENTH COMPARATIVE EXAMPLE

The seventh comparative example used, as the positive electrode active material, a powder having a chemical composition expressed by the formula of $Li_2NiMn_{0.67}Ge_{0.33}O_4$. Other components of the lithium-ion rechargeable battery 1 according to the seventh comparative example were the same as those of the lithium-ion rechargeable battery 1 according to the twelfth example.

[Evaluation]

A description will now be given of evaluation of each of the sixth to twelfth examples and the fourth to seventh comparative examples.

Prior to the evaluation of the lithium-ion rechargeable battery 1 according to the sixth to eleventh examples, performance of the positive electrode 11 and the negative electrode 12 thereof were measured.

The evaluation of the positive electrode 11 and the negative electrode 12 was performed by using a test cell of a half-cell type. The following measurement method will be explained for the positive electrode 11. It is possible to measure performance of the negative electrode 11 by using the same following measurement method.

The test cell of a half-cell type according to the sixth to twelfth examples and the fourth to seventh comparative examples has a structure of the coin type battery according to the sixth exemplary embodiment shown in FIG. 7. In the evaluation of the positive electrode 11, metallic lithium was used as the negative electrode 12. Similarly, in the evaluation of the negative electrode 12, metallic lithium was also used as the positive electrode 12.

The test cell of a half-cell type according to the sixth to twelfth examples and the fourth to seventh comparative examples used the non-aqueous electrolyte 13 which was used in the lithium-ion rechargeable battery 1 according to the sixth to twelfth examples and the fourth to seventh comparative examples.

After assembly, the CC charge of the test cell of a half-cell type, according to the sixth to ninth, the eleventh to twelfth examples, and the fourth comparative example which were used for evaluation of the positive electrode 11, was performed at room temperature until the 4.3 [V] cut-off voltage, and the CC discharge thereof was performed at room temperature until the 2.0 [V] cut-off voltage. The activation of the test cell of a half-cell type was performed by 1/3 C×5 cycles.

Similar to the evaluation of the positive electrode 11 previously described, after being assembled, the CC discharge of the test cell of a half-cell type, according to the sixth to ninth, the eleventh to twelfth examples, and the fourth comparative example which were used for evaluation of the negative electrode 12, was performed at room temperature until the 0.01 [V] cut-off voltage, and the CC charge thereof was performed at room temperature until the 2.0 [V] cut-off voltage. The activation of the test cell was performed by 1/10 C×5 cycles.

In the lithium-ion rechargeable battery 1 according to the sixth to twelfth examples and the fourth to seventh comparative examples to be evaluated, the positive electrode 11 was a working electrode (WE), and the negative electrode 12 was a counter electrode (CE), and a reference electrode (RE) made of a lithium metal was used to form a three-electrode type cell.

After assembly of the three-electrode type cell according to the sixth to ninth and eleventh to twelfth examples and the fourth comparative example to be evaluated, the activation of the three-electrode type cell was performed at room temperature by 1/3 C×5 cycles, i.e. the CC charge thereof was performed until the 4.1 [V] cut-off voltage, and the CC discharge thereof was performed until the 2.5 [V] cutoff voltage.

After assembly of the test cell of a half-cell type according to the tenth example and the fifth comparative example to be used for evaluation of the positive electrode 11, the charge and discharge of the test cell of a half-cell type was performed at 1/3 C×5 cycles. The CC charge thereof was performed until the 4.3 V cut-off voltage, and the CC discharge thereof was performed until the 2.0 V cut-off voltage.

After assembly of the test cell of a half-cell type according to the tenth example and the fifth comparative example to be used for evaluation of the negative electrode 12, the charge and discharge of the test cell of a half-cell type was performed at 1/10 C×5 cycles. The CC discharge thereof was performed until the 0.05 V cut-off voltage, and the CC charge thereof was performed until the 2.0 V cut-off voltage.

After assembly of the three-electrode type cell according to the tenth example and the fifth comparative example, the activation of the three-electrode type cell was performed at room temperature at 1/3 C×5 cycles, i.e. the CC charge thereof was performed until the 2.8 [V] cut-off voltage, and the CC discharge thereof was performed until the 2.0 [V] cutoff voltage.

(Evaluation of Test Cell)
(Measurement of Capacity of Positive Electrode)

The charge and discharge of the test cell of a half-cell type according to the sixth to twelfth examples and the fourth to seventh comparative examples was performed at the rate of 1/3 C CC. The CC charge thereof was performed until the 4.3 V cut-off voltage, and the CC discharge thereof was performed until the 2.0 V cut-off voltage. The obtained discharge capacity was used as the battery capacity of the test cell, and the capacity of the positive electrode 11. Table 2 shows the measurement results of those test cells of a half-cell type.

(Confirmation of Potential-Battery Capacity of Positive Electrode)

The CC charge of each test cell of a half-cell type according to the sixth to twelfth examples and the fourth to seventh comparative examples was performed at the rate of 1/3 C until the 4.3 V cut-off voltage in order to reach a full-charged state thereof. After this charge, the CC discharge of a predetermined capacity of each test cell was performed in order to reach a target SOC value. After the adjustment of the SOC, a potential of each electrode at the predetermined SOC was calculated to obtain a relationship in potential between the positive electrode potential and SOC of the positive electrode. FIG. 8 and FIG. 9 show the graphs regarding the calculated relationship.

(Confirmation of Positive Electrode Resistance)

The CC charge of each test cell of a half-cell type according to the sixth to twelfth examples and the fourth to seventh comparative examples was performed at the rate of 1/3 C until the 4.3 [V] cut-off voltage to reach the full charged state thereof. After this charge, the CC discharge of a predetermined capacity of each test cell was performed in order to reach a target SOC value. After the adjustment of the SOC, each test cell was charged at the rate of 1/2 C, and a voltage value of each test cell after the elapse of 10 seconds was measured. Similarly, each test cell was charged at 1 C and 3 C and a voltage value of each test cell after elapse of 10 seconds was measured. A resistance of each test cell was calculated by the least-rectangle method using the charge current value and the measured voltage of each test cell. The calculated resistance value indicates the resistance of each test cell, i.e. the resistance of the positive electrode 11.

(Confirmation of Resistance Ratio of Positive Electrode)

An input resistance of each test cell of a half-cell type according to the sixth to twelfth examples and the fourth to seventh comparative examples was measured at 0% SOC of a single pole (i.e., the resistance of the positive electrode 11 of each test cell) was measured. Further, an input resistance of each test cell of a half-cell type at 10% SOC of the single pole (i.e., the resistance of the positive electrode 11 of each test cell) was measured. A resistance ratio between the two resistance values of the positive electrode 11 measured when the SOC was 0% and 10% was calculated. Table 2 shows those calculation results of the resistance ratio. The 10% SOC corresponds to an SOC which is not less than the predetermined SOC previously described.

(Measurement of Capacity of Negative Electrode)

The charge and discharge of the test cell of a half-cell type according to the sixth to twelfth examples and the fourth to seventh comparative examples was performed at the rate of 1/3 C CC. The CC discharge thereof was performed until the 0.01 V cut-off voltage, and the CC charge thereof was performed until the 2.0 V cut-off voltage. The obtained discharge capacity was used as the battery capacity of the test cell, and the capacity of the negative electrode 12.

(Confirmation of Potential-Battery Capacity of Negative Electrode)

The discharge of each test cell of a half-cell type according to the sixth to twelfth examples and the fourth to seventh comparative examples was performed at 1/10 C rate until the 0.01 cut-off voltage. After this discharge, the CC charge of a predetermined capacity of each test cell was performed in order to reach a target SOC value. After the adjustment of the SOC, a potential of each electrode at the predetermined SOC was calculated to obtain a relationship between the negative electrode potential and SOC of the negative electrode. FIG. 8 and FIG. 9 show the graphs regarding the calculated relationship.

(Evaluation of Lithium-Ion Rechargeable Battery)
(Measurement of Battery Capacity of Lithium-Ion Rechargeable Battery)

The charge and discharge of the lithium-ion rechargeable battery according to the sixth to twelfth examples and the fourth to seventh comparative examples was performed at the rate of 1/3 C. That is, the CC charge thereof was performed until the 4.1 [V] cut-off voltage, and the CC discharge was performed until the 2.5 [V] cut-off voltage. The obtained discharge capacity was used as the battery capacity of the lithium-ion rechargeable battery according to each example.

(Confirmation of Resistance of Lithium-Ion Rechargeable Battery)

The CC charge of the lithium-ion rechargeable battery according to the sixth to twelfth examples and the fourth to seventh comparative examples was performed at the rate of 1/3 C until the 4.1 [V] cut-off voltage to reach the full charged state thereof. After this, the CC discharge of the predetermined capacity of each of the first to fifth examples and the first to third comparative examples was performed to obtain the target SOC. After the adjustment of the SOC of each example, the discharge was performed at the rate of 1/2 C for 10 seconds. After the elapse of 10 seconds, a battery voltage of each test cell was measured. Similarly, a voltage of each test cell was measured at the rate of 1 C and 3 C, and a voltage value of each example after elapse of 10 seconds was measured. A resistance of each test cell was calculated by the least-rectangle method using the charge current value and the measured voltage of each example. The calculated resistance value indicates the resistance of the lithium-ion rechargeable battery as each example.

(Resistance Ratio of Lithium-Ion Rechargeable Battery)

An input resistance of the lithium-ion rechargeable battery 1 according to the sixth to twelfth examples and the fourth to seventh comparative examples was measured at 10% of its SOC. Further, an input resistance of each example was measured at zero % SOC. A resistance ratio of each example was calculated on the basis of the measured resistances of each example.

(Evaluation of Three Electrode Cell)
(Measurement of Battery Capacity of Lithium-Ion Rechargeable Battery)

The charge and discharge of the three electrode cell according to the sixth to twelfth examples and the fourth to seventh comparative examples was performed at the rate of 1/3 C. That is, the CC charge thereof was performed until the 4.1 [V] cut-off voltage, and the CC discharge was performed until the 2.5 [V] cut-off voltage. The obtained discharge capacity was used as the battery capacity of the three electrode cell as the lithium-ion rechargeable battery according to each example.

(Measurement of SOC of Each of Positive Electrode and Negative Electrode)

The CC charge and CC discharge of the three electrode cell according to the sixth to twelfth examples and the fourth to seventh comparative examples was performed at the rate of 1/3 C. That is, the CC charge of the three electrode cell according to the sixth to twelfth examples and the fourth to seventh comparative examples was performed until the 4.3 V cut-off voltage in order to reach a full-charged state thereof. After this charge, the CC discharge of a predetermined capacity of the three electrode cell of each example was performed in order to reach a target SOC value. After the adjustment of the SOC, a potential of each of the working electrode and the opposite electrode to the reference electrode was measured. The measured potentials are used as the positive electrode potential and the negative electrode potential, respectively.

A SOC of the positive electrode was calculated on the basis of a relationship between the potential of the positive electrode and the SOC of the positive electrode only which have been measured. Similarly, a SOC of the negative electrode was calculated on the basis of a relationship between the potential of the positive electrode and the SOC of the negative electrode only which have been measured.

(Measurement of Average OCP of Negative Electrode)

The SOC of the negative electrode at 50% SOC in the three electrode cell according to the sixth to twelfth examples and the fourth to seventh comparative examples was measured.

(Capacity Ratio of Negative Electrode)

In the three electrode type cell according to the sixth to twelfth examples and the fourth to seventh comparative examples, an capacity within a range from (average OCP of the negative electrode−0.15 [V]) to (average OCP of the negative electrode+0.25 [V]) was calculated, and a range of more than (the average OCP of the negative electrode+0.25 [V]) was calculated. The capacity ratio was calculated on the basis of the calculated two capacities.

TABLE 2

| Example | Positive electrode active material | Negative electrode active material/ parts by mass ratio | Positive electrode resistance ratio | Average OCP of negative electrode | Capacity ratio of negative electrode | Resistance ratio of lithium-ion rechargeable battery | SOC of positive electrode |
|---|---|---|---|---|---|---|---|
| Sixth example | $Li_2NiMn_{0.67}Sn_{0.33}O_4$ | Graphite powder: 90 parts by mass<br>Easily graphitizable carbon: 8 parts by mass | 2.8 | 0.13 V | 0.06 | 1.2 | 15% |
| Seventh example | $Li_2NiMn_{0.67}Sn_{0.33}O_4$ | Easily graphitizable carbon: 98 parts by mass | 2.8 | 0.30 V | 1 | 1 | 28% |
| Eighth example | $Li_2NiMn_{0.67}Sn_{0.33}O_4$<br>$Li_2NiMn_{0.67}Sn_{0.33}O_4$ | Graphite powder: 90 parts by mass<br>Hardly graphitizable carbon: 8 parts by mass | 2.8 | 0.13 V | 0.06 | 1.1 | 13% |
| Ninth example | $Li_2NiMn_{0.67}Sn_{0.33}O_4$ | Graphite powder: 93 parts by mass<br>Silicon oxide powder: 5 parts by mass | 2.8 | 0.14 V | 0.16 | 1.1 | 18% |
| Tenth example | $Li_2NiMn_{0.67}Sn_{0.33}O_4$ | Lithium titanate powder: 40 parts by mass<br>$TiO_2(B)$: 40 parts by mass | 2.8 | 1.6 V | 0.06 | 1.2 | 14% |
| eleventh example | $Li_2Ni_{0.67}Co_{0.67}Mn_{0.33}Sn_{0.33}O_4$ | Graphite powder: 90 parts by mass<br>Easily graphitizable carbon: 8 parts by mass | 4.4 | 0.13 V | 0.06 | 1.2 | 15% |
| Twelfth example | $Li_2NiMn_{0.67}Ge_{0.33}O_4$ | Graphite powder: 90 parts by mass<br>Easily graphitizable carbon: 8 parts by mass | 2.9 | 0.13 V | 0.06 | 1.2 | 15% |
| Fourth comparative example | $Li_2NiMn_{0.67}Sn_{0.33}O_4$ | Graphite powder: 98 parts by mass | 2.8 | 0.13 V | 0.04 | 1.8 | 7% |
| Fifth comparative example | $Li_2NiMn_{0.67}Sn_{0.33}O_4$ | Lithium titanate powder: 90 parts by mass | 2.8 | 1.56 V | 0.02 | 1.8 | 6% |
| Sixth comparative example | $Li_2Ni_{0.67}Co_{0.67}Mn_{0.33}Sn_{0.33}O_4$ | Graphite powder: 98 parts by mass | 4.4 | 0.13 V | 0.04 | 2.3 | 7% |
| Seventh comparative example | $Li_2NiMn_{0.67}Ge_{0.33}O_4$ | Graphite powder: 98 parts by mass | 2.9 | 0.13 V | 0.04 | 1.8 | 7% |

As shown in Table 2, the positive electrode resistance ratio of the positive electrode 11 according to the sixth to twelfth examples and the fourth to seventh comparative examples becomes not less than 2.0. That is, the positive electrode 11 used in each of the sixth to twelfth examples and the fourth to seventh comparative examples example has the resistance value at 0% SOC is not less than 0.5 times of the resistance value at 10% SOC.

According to the evaluation results previously described shown in Table 2, the lithium-ion rechargeable battery according to the sixth to twelfth examples has the negative electrode 12 having its capacity ratio of not less than 0.05. On the other hand, the lithium-ion rechargeable battery according to the fourth to seventh comparative examples has the negative electrode 12 having its capacity ratio of less than 0.05 (in more detail, not more than 0.04).

As shown in Table 2, the lithium-ion rechargeable battery according to the sixth to twelfth examples has the low resistance ratio of not more than 1.2 (in more detail, within a range of 1.0 to 1.2). That is, in the lithium-ion rechargeable battery according to the sixth to twelfth examples, the difference between the input resistance at SOC of 0% and the input resistance at SOC of 10% becomes a small value.

On the other hand, the lithium-ion rechargeable battery according to the fourth to seventh comparative examples has a resistance ratio of not less than 2.9 (in more detail, within a range of 2.9 to 4.4). That is, in the lithium-ion rechargeable battery according to the fourth to seventh comparative examples, the difference between the input resistance at SOC of 0% and the input resistance at SOC of 10% becomes a large value.

According to the results shown in Table 2, it is possible for the lithium-ion rechargeable battery according to the sixth to twelfth examples to charge in a low resistance state within a range of not less than 0% SOC of the lithium-ion rechargeable battery.

On the other hand, in the lithium-ion rechargeable battery according to the fourth to seventh comparative examples, the input resistance thereof increases when the SOC of the lithium-ion rechargeable battery is not more than 10% of the. This recognizes that the performance of the lithium-ion rechargeable battery according to the fourth to seventh comparative examples decrease in the range of not more than 10% SOC.

In more detail, in the lithium-ion rechargeable battery according to the fourth to seventh comparative examples, the SOC of the positive electrode 11 at 0% SOC of the lithium-ion rechargeable battery is within a range of 8 to 10%. The positive electrode 11 has a high resistance value when the SOC of the positive electrode 11 is within this range of range of 8 to 10%.

On the other hand, in the lithium-ion rechargeable battery according to the sixth to twelfth examples, the SOC of the positive electrode 11 at 0% SOC of the lithium-ion rechargeable battery is within a range of 18 to 28%, which is higher than the SOC of the positive electrode according to the fourth to seventh comparative examples. The positive electrode 11 has a high resistance value when the SOC of the positive electrode 11 is within the range of not less than 18%.

That is, it can be understood that the lithium-ion rechargeable battery according to the sixth to twelfth examples does not use a high resistance region when the SOC of the positive electrode 11 is low.

As previously explained in detail, the lithium-ion rechargeable battery according to the sixth to twelfth examples has the superior features capable of suppressing the battery performance from deteriorating in the low SOC range.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A non-aqueous rechargeable battery comprising a positive electrode and a negative electrode and a non-aqueous electrolyte, and the positive electrode and the negative electrode being capable of intercalating and deintercalating lithium ions,
   wherein the positive electrode contains a lithium transition metal oxide expressed by a formula of $Li_{2-x}Ni_\alpha M^1_\beta M^2_\gamma O_{4-\varepsilon}$, where $0.50<\alpha<=1.33$, $0<=\beta<0.67$, $0<=\gamma<=1.33$, $0<=\varepsilon<=1.00$, M1 is at least one of Co, Al and Ga, and M21 is at least one of Mn, Ge, Sn and Sb, and x reversibly varies within a range of $0<=x<=2$ by intercalating and deintercalating lithium ions,
   a resistance of the positive electrode when a state of charge (SOC) is zero % is not less than twice of a resistance of the positive electrode when the SOC is not less than a predetermined SOC,
   a capacity of the negative electrode is not less than 1.1 times of a capacity of the positive electrode, and
   the negative electrode contains carbon material capable of intercalating and deintercalating lithium ions.

2. The non-aqueous rechargeable battery according to claim 1,
   wherein an irreversible capacity loss of the positive electrode at its initial charge and discharge is less than an irreversible capacity loss of the negative electrode at its initial charge and discharge.

3. The non-aqueous rechargeable battery according to claim 1, wherein the non-aqueous rechargeable battery has a lower limit voltage (X [V]) within a range of $2.5 V <=X <=3.0 V$, and
   an open circuit potential (OCP) of the negative electrode is not less than (2.7−X) [V] when the non-aqueous rechargeable battery reaches the lower limit voltage.

4. The non-aqueous rechargeable battery according to claim 1, wherein the predetermined SOC is not more than 10 %.

5. The non-aqueous rechargeable battery according to claim 1, wherein the SOC of the positive electrode is not less than the predetermined SOC when the non-aqueous rechargeable battery reaches the lower limit voltage.

6. A non-aqueous rechargeable battery comprising a positive electrode, a negative electrode and a non-aqueous electrolyte, the positive electrode and the negative electrode being capable of intercalating and deintercalating lithium ions,
   wherein the positive electrode contains lithium transition metal oxide expressed by a formula of $Li_{2-x}Ni_\alpha M^1_\beta M^2_\gamma O_{4-\varepsilon}$, where $0.50<\alpha<=1.33$, $0<=\beta<0.67$, $0<=\gamma<=1.33$, $0<=\varepsilon<=1.00$, , M1 is at least one of Co, Al and Ga, and M2 is at least one of Mn, Ge, Sn and Sb, and x reversibly varies within a range of $0<=x<=2$ by intercalating and deintercalating lithium ions,
   a resistance of the positive electrode when a state of charge (SOC) is zero % is not less than twice of a resistance of the positive electrode when the SOC is not less than a predetermined SOC,
   a ratio of a first capacity of the negative electrode and a second capacity of the negative electrode is not less than 0.05, , where the first capacity is within a range of more than (an average OCP −0.10 [V]) and less than (the average OCP +0.25 [V]), the second capacity is greater than the (average OCP +0.25 [V]), and the average OCP is a potential of the negative electrode when the non-aqueous rechargeable battery has 50 % SOC, and the negative electrode contains carbon material which contains one of hardly graphitizable carbon and easily graphitizable carbon, and the carbon material contains the hardly graphitizable carbon or the easily graphitizable carbon of not less than 5 mass % when an overall mass of the carbon material is 100 mass %.

7. The non-aqueous rechargeable battery according to claim 6, wherein the predetermined SOC is a value of not more than 15 %.

8. A non-aqueous rechargeable battery comprising a positive electrode, a negative electrode and a non-aqueous electrolyte, the positive electrode and the negative electrode being capable of intercalating and deintercalating lithium ions, wherein the positive electrode contains lithium transition metal oxide expressed by a formula of $Li_{2-x}Ni_\alpha M^1_\beta M^2_\gamma O_{4-\varepsilon}$, where $0.50 < \alpha <= 1.33$, $0 <= \beta < 0.67$, $0 <= \gamma <= 1.33$, $0 <= \varepsilon <= 1.00$, , M1 is at least one of Co, Al and Ga, and M2 is at least one of Mn, Ge, Sn and Sb, and x reversibly varies within a range of $0 <= x <= 2$ by intercalating and deintercalating lithium ions, a resistance of the positive electrode when a state of charge (SOC) is zero % is not less than twice of a resistance of the positive electrode when the SOC is not less than a predetermined SOC, a ratio of a first capacity of the negative electrode and a second capacity of the negative electrode is not less than 0.05, , where the first capacity is within a range of more than (an average OCP −0.10 )[V]), and less than (the average OCP +0.25[V]), the second capacity is greater than the (average OCP +0.25[V]), and the average OCP is a potential of the negative electrode when the non-aqueous rechargeable battery has 50 % SOC, and the negative electrode contains silicon or silicon oxide as negative electrode active material.

9. The non-aqueous rechargeable battery according to claim 8, wherein the negative electrode active material further contains carbon.

10. The non-aqueous rechargeable battery according to claim 8, wherein the predetermined SOC is a value of not more than 15 %.

11. A non-aqueous rechargeable battery comprising a positive electrode, a negative electrode and a non-aqueous electrolyte, the positive electrode and the negative electrode being capable of intercalating and deintercalating lithium ions, wherein the positive electrode contains lithium transition metal oxide expressed by a formula of $Li_{2-x}Ni_\alpha M^1_\beta M^2_\gamma O_{4-\varepsilon}$, where $0.50 < \alpha <= 1.33$, $0 <= \beta < 0.67$, $0 <= \gamma <= 1.33$, $0 <= \varepsilon <= 1.00$, , M1 is at least one of Co, Al and Ga, and M2 is at least one of Mn, Ge, Sn and Sb, and x reversibly varies within a range of $0 <= x <= 2$ by intercalating and deintercalating lithium ions, and a resistance of the positive electrode when a state of charge (SOC) is zero % is not less than twice of a resistance of the positive electrode when the SOC is not less than a predetermined SOC, a ratio of a first capacity of the negative electrode and a second capacity of the negative electrode is not less than 0.05, , where the first capacity is within a range of more than (an average OCP −0.10[V]) and less than (the average OCP +0.25[V]), the second capacity is greater than the (average OCP +0.25[V]), and the average OCP is a potential of the negative electrode when the non-aqueous rechargeable battery has 50 % SOC, and the negative electrode further contains lithium-titanium composite oxide as the negative electrode active material.

12. The non-aqueous rechargeable battery according to claim 11, wherein the lithium-titanium composite oxide contains not less than 5 mass % when an overall mass of the lithium-titanium composite oxide is 100 mass %.

13. The non-aqueous rechargeable battery according to claim 11, wherein the predetermined SOC is a value of not more than 15%.

* * * * *